(12) United States Patent
Sakakibara

(10) Patent No.: US 9,906,156 B2
(45) Date of Patent: Feb. 27, 2018

(54) DIRECT-POWER-CONVERTER CONTROL DEVICE

(71) Applicant: DAIKIN INDUSTRIES, LTD., Osaka-Shi, Osaka (JP)

(72) Inventor: Kenichi Sakakibara, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/516,305

(22) PCT Filed: Oct. 7, 2015

(86) PCT No.: PCT/JP2015/078470
§ 371 (c)(1),
(2) Date: Mar. 31, 2017

(87) PCT Pub. No.: WO2016/060039
PCT Pub. Date: Apr. 21, 2016

(65) Prior Publication Data
US 2017/0310235 A1    Oct. 26, 2017

(30) Foreign Application Priority Data

Oct. 15, 2014    (JP) .................................. 2014-210843

(51) Int. Cl.
*H02M 5/45* (2006.01)
*H02M 5/458* (2006.01)
(Continued)

(52) U.S. Cl.
CPC ......... *H02M 5/4585* (2013.01); *H02M 1/088* (2013.01); *H02M 1/15* (2013.01); *H02M 3/158* (2013.01)

(58) Field of Classification Search
CPC .......... H02M 1/08; H02M 1/088; H02M 1/14; H02M 1/15; H02M 3/158; H02M 5/40; H02M 5/45; H02M 5/453; H02M 5/458
See application file for complete search history.

(56) References Cited

U.S. PATENT DOCUMENTS 8,054,012 B2 * 11/2011 Matsubara ............ H02M 5/458
318/139
8,143,836 B2 *  3/2012 Iwashita ................. H02J 7/345
318/139
(Continued)

FOREIGN PATENT DOCUMENTS

JP    2011-193678 A    9/2011
JP       5454732 B1    3/2014
(Continued)

OTHER PUBLICATIONS

International Search Report issued in PCT/JP2015/078470 (PCT/ISA/210), dated Dec. 28, 2015.
(Continued)

*Primary Examiner* — Matthew Nguyen
(74) *Attorney, Agent, or Firm* — Birch, Stewart, Kolasch & Birch, LLP

(57) ABSTRACT

A control device includes a charge controller. The charge controller includes an amplitude determining unit, a charge command generating unit, and a charging operation controller. The amplitude determining unit determines an amplitude of a current to be input to a converter by performing at least proportional-integral control on a deviation between a voltage across the buffer capacitor and an average voltage command value that is a command value of an average of the voltage across the buffer capacitor. The charge command generating unit determines a charge command by multiplying by the amplitude a function determined according to a discharge duty, a rectifying duty, and a distribution factor of
(Continued)

power. The charging operation controller controls a charging operation of the buffer capacitor on the basis of the charge command.

12 Claims, 16 Drawing Sheets

(51) Int. Cl.
*H02M 1/088* (2006.01)
*H02M 1/15* (2006.01)
*H02M 3/158* (2006.01)

(56) References Cited

U.S. PATENT DOCUMENTS

| | | | |
|---|---|---|---|
| 9,450,502 B2 | 9/2016 | Sakakibara | |
| 9,490,722 B2 | 11/2016 | Sakakibara | |
| 2014/0021888 A1* | 1/2014 | Niwa | H02P 27/00 318/139 |
| 2015/0244282 A1* | 8/2015 | Yamashita | H02M 1/4225 363/35 |
| 2016/0072281 A1* | 3/2016 | Izumi | G05B 15/02 700/296 |
| 2017/0201202 A1* | 7/2017 | Yamashita | H02P 27/08 |

FOREIGN PATENT DOCUMENTS

| | | |
|---|---|---|
| JP | 2014-96976 A | 5/2014 |
| JP | 2014-107935 A | 6/2014 |
| WO | WO 2013/146340 A1 | 10/2013 |

OTHER PUBLICATIONS

Ohnuma et al., "Basic Investigation and Capacitance Reduction method of a Novel Single-Phase to Three-Phase Power Converter", The papers of Technical Meeting on Semiconductor Power Converter, IEE Japan, SPC-08-16, 2008, pp. 7-12.

Ohnuma et al., "Circuit Configuration and Control Strategy of single-to-three Phase Power Converter with Active Buffer and Charge Circuit", The 2010 Annual Meeting of the Institute of Electrical Engineers of Japan, 4-057, 2010, pp. 95-96 (Total No. pp. 5).

Ohnuma et al., "Experimental Verification of Single Phase to Three Phase Converter Using an Active Buffer circuit with a Charge Circuit", 2010 IEE-Japan Industry Applications Society Conference, 1-124, 2010, pp. I-587-I-590.

\* cited by examiner

F I G. 3
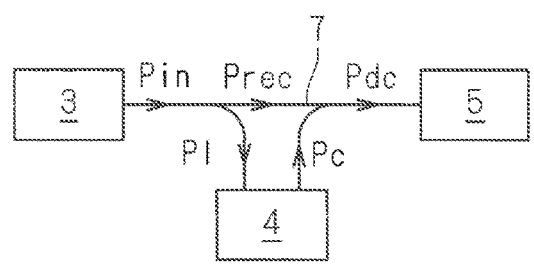
F I G. 4
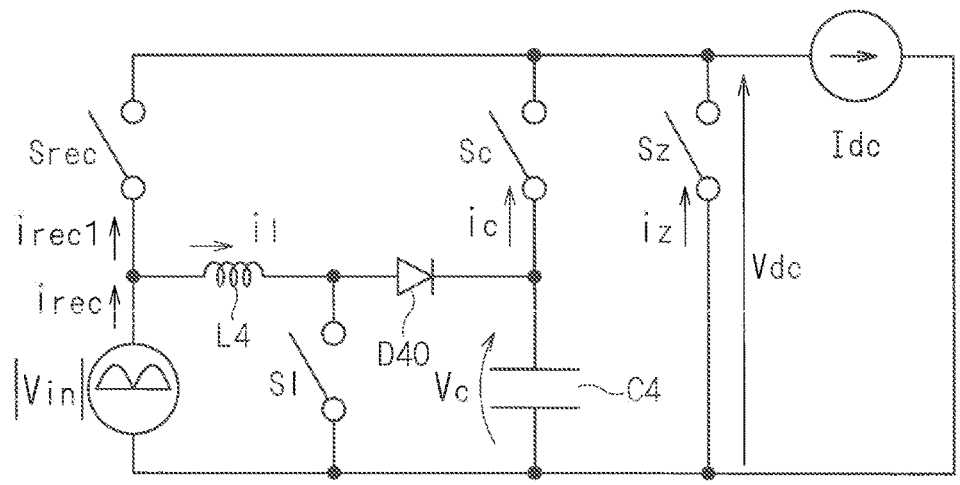

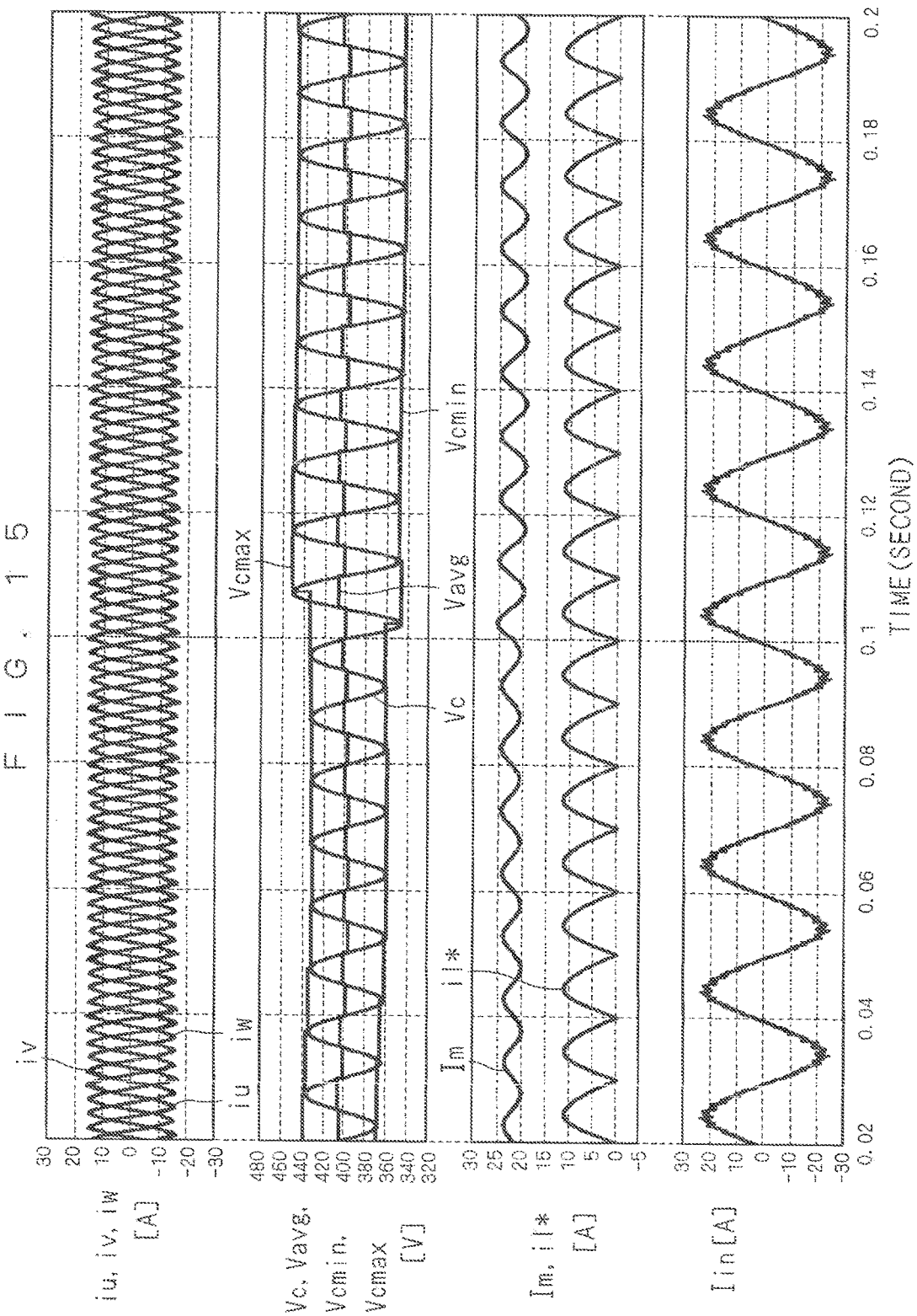

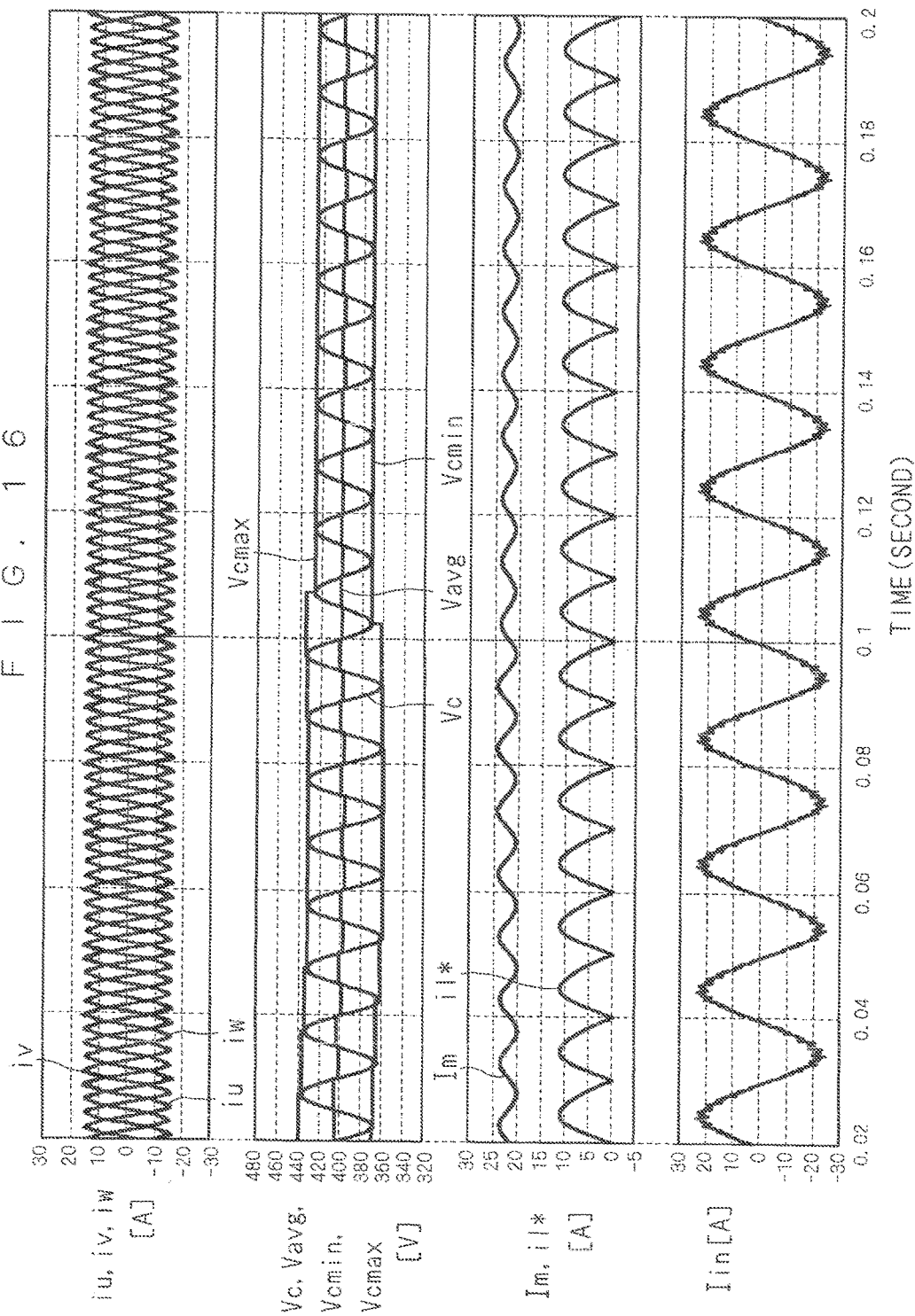

F I G . 1 7
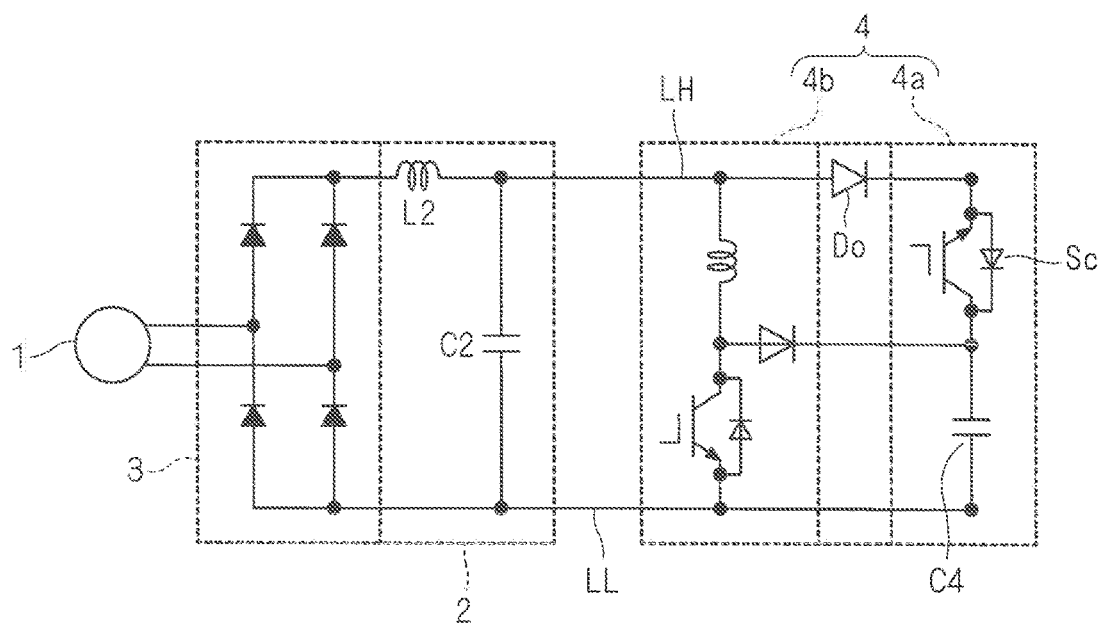

US 9,906,156 B2

DIRECT-POWER-CONVERTER CONTROL DEVICE

TECHNICAL FIELD

This invention relates to a technique for controlling a direct power converter including a converter, an inverter, and a power buffer circuit that are mutually connected through a DC link.

BACKGROUND ART

Generally, full-wave rectifying circuits are used as converters to obtain a DC voltage from a single-phase AC voltage input from a single-phase AC power source. However, the output of the full-wave rectifying circuits contains power ripple having a frequency twice that of the single-phase AC voltage. Thus, reduction in this power ripple requires a power buffer circuit that buffers the power between an output of the full-wave rectifying circuit and a load.

Ohnuma, Itoh, "Circuit Configuration and Control Strategy of single-to-three Phase Power Converter with Active Buffer and Charge Circuit", The 2010 Annual Meeting of the Institute of Electrical Engineers of Japan, 4-057 (2010), Ohnuma, Itoh, "Experimental Verification of Single Phase to Three Phase Converter Using an Active Buffer circuit with a Charge Circuit", 2010 IEE—Japan Industry Applications Society Conference, 1-124 (2010), Ohnuma, Itoh, "Basic Investigation and Capacitance Reduction method of A Novel Single-Phase to Three-Phase Power Converter", The papers of Technical Meeting on Semiconductor Power Converter, IEE Japan, SPC-08-16 (2008), Japanese Patent Application Laid-Open No. 2011-193678, Japanese Patent Application Laid-Open No. 2014-107935, Japanese Patent No. 5454732 and Japanese Patent Application Laid-Open No. 2014-96976 disclose a technique for connecting a capacitor to a DC link through a switching element. In the proposed technique, the capacitor (hereinafter also referred to as a "buffer capacitor"), which functions as a voltage source, drives a load together with a power supply voltage to compensate for the power ripple as well as reduce the electrostatic capacity required for the buffer capacitor.

Particularly, Ohnuma, Itoh, "Circuit Configuration and Control Strategy of single-to-three Phase Power Converter with Active Buffer and Charge Circuit", The 2010 Annual Meeting of the Institute of Electrical Engineers of Japan, 4-057 (2010), Ohnuma, Itoh, "Experimental Verification of Single Phase to Three Phase Converter Using an Active Buffer circuit with a Charge Circuit", 2010 IEE—Japan Industry Applications Society Conference, 1-124 (2010), Japanese Patent Application Laid-Open No. 2011-193678, Japanese Patent Application Laid-Open No. 2014-107935, Japanese Patent No. 5454732 and Japanese Patent Application Laid-Open No. 2014-96976 also propose a technique that achieves a function of a boost chopper using a reactor and a switch to boost a voltage across a buffer capacitor (hereinafter referred to as a "both-end voltage").

Ohnuma, Itoh, "Experimental Verification of Single Phase to Three Phase Converter Using an Active Buffer circuit with a Charge Circuit", 2010 IEE—Japan Industry Applications Society Conference, 1-124 (2010) teaches a case (a discontinuous mode) where a reactor current flowing through a reactor is discontinuous to achieve the function of the boost chopper. A command value of the reactor current (hereinafter also referred to as a "reactor current command") depends on a current to be input to a full-wave rectifying circuit. Ohnuma, Itoh, "Experimental Verification of Single Phase to Three Phase Converter Using an Active Buffer circuit with a Charge Circuit", 2010 IEE—Japan Industry Applications Society Conference, 1-124 (2010) also teaches a technique for estimating the input current by obtaining the maximum value and the minimum value of a both-end voltage.

Furthermore, Japanese Patent Application Laid-Open No. 2014-107935 discloses a technique for maintaining an average of a both-end voltage. Japanese Patent No. 5454732 teaches cases where the reactor current flows not only in the discontinuous mode but also in a critical mode.

SUMMARY OF INVENTION

Problems to be Solved by the Invention

However, use of film capacitors as the buffer capacitors is undesirable in consideration of downsizing the buffer capacitors. Here, options for capacitors to be used as the buffer capacitors include ceramic capacitors and electrolytic capacitors.

The tolerance range of the electrostatic capacity of the electrolytic capacitors largely varies from ±20% to ±30%. Moreover, the electrostatic capacity tends to decrease according to degradation of the capacitors. When the voltage of the buffer capacitor varies according to change in the electrostatic capacity, an error increases in estimating an input current. This induces variations in the both-end voltage. When the variations are prominent, a direct power converter may not be operable.

Thus, the present invention has an object of providing a technique for making variations in the both-end voltage less prominent even when the electrostatic capacity of the buffer capacitor varies.

Means to Solve the Problems

The direct-power-converter control device according to this invention is a control device (10) that controls a direct power converter.

The direct power converter includes: a DC link (7) including a first power supply line (LH) and a second power supply line; a converter (3) that receives a single-phase AC voltage (Vin), and outputs ripple power (Pin) to the DC link in which the first power supply line is higher in potential than the second power supply line; a power buffer circuit (4) provided between the first and second power supply lines, the power buffer circuit buffering power by buffered power (Pbuf) obtained by multiplying an AC component (Pin^) of the ripple power (Pin) by a distribution factor (k); and an inverter (5) that converts a DC voltage (Vdc) between the first and second power supply lines into an AC voltage.

The power buffer circuit includes: a discharge circuit (4a) including a capacitor (C4) and a switch (Sc, D42) connected in series with the capacitor between the first and second power supply lines, the switch being closer to the first power supply line relative to the capacitor; and a charge circuit (4b) that charges the capacitor.

The control device includes an inverter controller (101), a discharge controller (102), and a charge controller (103).

The inverter controller outputs an inverter control signal (SSup, SSvp, SSwp, SSun, SSvn, SSwn) for controlling an operation of the inverter on the basis of a rectifying duty (drec), a discharge duty (dc), and a command value (Vu*, Vv*, Vw*) of a voltage to be output by the inverter, the rectifying duty being a duty at which the converter is brought into conduction with the DC link, the discharge duty being a duty at which the switch is conducting.

The discharge controller outputs a discharge switch signal (SSc) for bringing the switch into conduction on the basis of the discharge duty.

The charge controller includes: an amplitude determining unit (103a) that determines an amplitude (Im) of an input current (Iin) to be input to the converter by performing at least proportional-integral control on a deviation (ΔVc) between a voltage across the capacitor and an average voltage command value (Vc*) that is a command value of an average of the voltage across the capacitor; a charge command generating unit (103b) that determines a charge command (iL*) on a current (il) flowing through the charge circuit by multiplying by the amplitude a function (F1 (ωt), F2 (ωt), F3 (ωt)) of a phase (ωt) of the single-phase AC voltage, the function being determined according to the discharge duty, the rectifying duty, and the distribution factor; and a charging operation controller (103c) that controls a charging operation of the charge circuit on the basis of the charge command.

For example, the discharge duty and the rectifying duty are set so that the power buffer circuit (4) receives power from the DC link during a period during which a cosine value (cos (2ωt)) is negative and provides power to the DC link during a period during which the cosine value is positive, the cosine value being a cosine of a value twice the phase (ωt).

Alternatively, power (Pl) received by the power buffer circuit (4) from the DC link (7) and power (Pc) provided by the power buffer circuit (4) to the DC link (7) are set to vary at a frequency twice a frequency of the single-phase AC voltage (Vin) as a fundamental frequency.

Preferably, the function is determined with the input current (Iin) having a sinusoidal waveform.

Preferably, responsiveness of the charge controller (103) is less than or equal to one tenth of a value twice a frequency of the single-phase AC voltage (Vin).

Effects of the Invention

Even when an electrostatic capacity of a capacitor (buffer capacitor) included in a discharge circuit of a power buffer circuit varies, variations in both-end voltage of the capacitor are made less prominent.

The objects, features, aspects and advantages of the present invention will become more apparent from the following detailed description and the accompanying drawings.

BRIEF DESCRIPTION OF DRAWINGS

FIG. 3 is a block diagram schematically illustrating the balance of power in the direct power converter illustrated in FIG. 1;

FIG. 4 is a diagram illustrating an equivalent circuit of the direct power converter illustrated in FIG. 1;

FIG. 15 is a graph indicating behaviors of various quantities in the third embodiment when the electrostatic capacity of the buffer capacitor decreases;

FIG. 16 is a graph indicating behaviors of various quantities in the third embodiment when the electrostatic capacity of the buffer capacitor increases; and FIG. 17 is a circuit diagram illustrating a modification of the direct power converter illustrated in FIG. 1.

DESCRIPTION OF EMBODIMENTS

Figure 1:
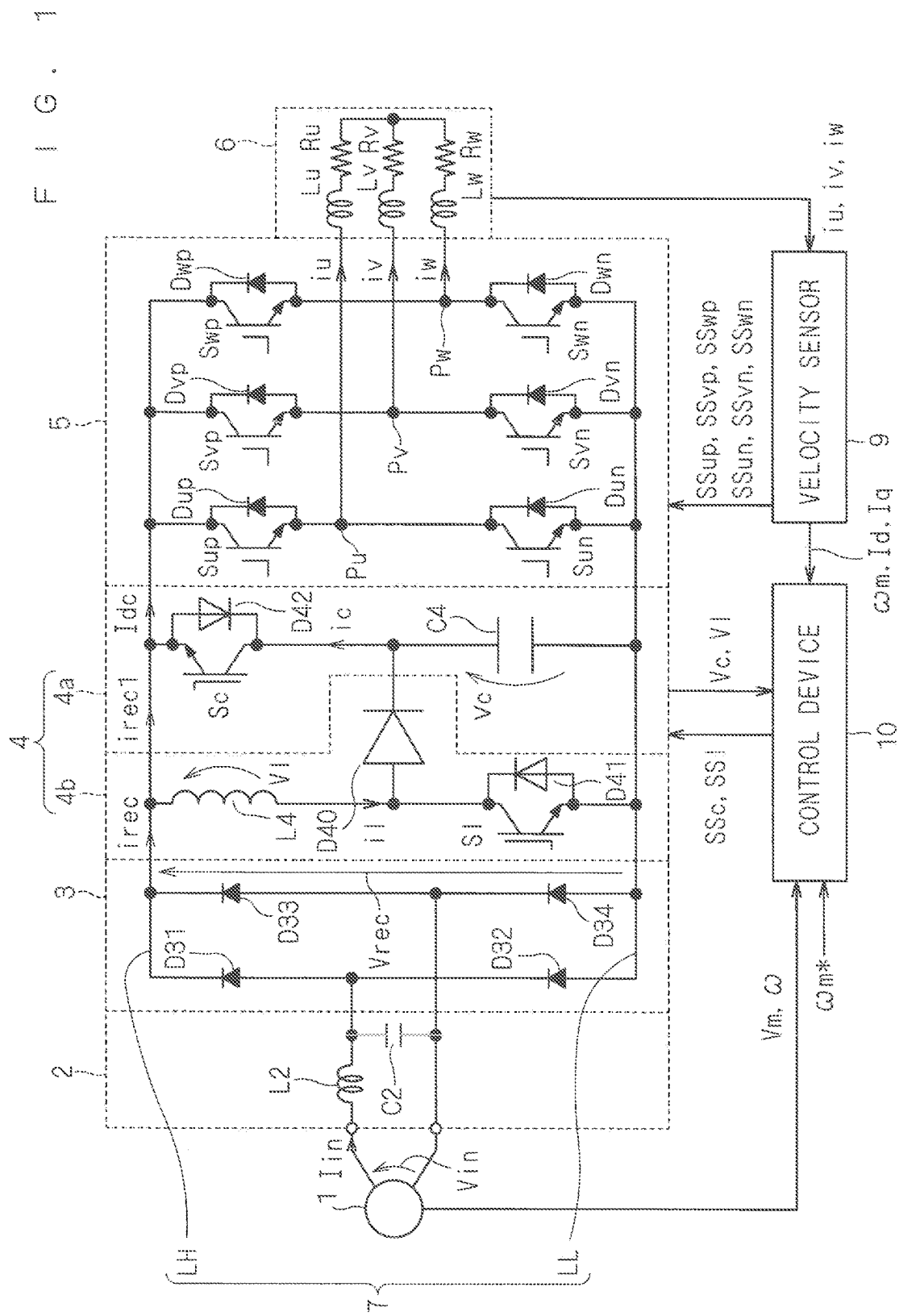
FIG. 1 is a block diagram illustrating a structure of a direct power converter according to embodiments.

A. Analysis of Problems with Conventional Techniques

Before describing embodiments in detail, problems with the conventional techniques will be analyzed to facilitate understanding of the present invention.

(i) First conventional technique: In Ohnuma, Itoh, "Experimental Verification of Single Phase to Three Phase Converter Using an Active Buffer circuit with a Charge Circuit", 2010 IEE—Japan Industry Applications Society Conference, 1-124 (2010), the minimum value of the both-end voltage is detected and the maximum value of the both-end voltage is used as a voltage command to control the both-end voltage. However, an average of the both-end voltage is high even when a load of an inverter is low because the maximum value of the both-end voltage is used as the voltage command (see, for example, FIG. 7 of Japanese Patent Application Laid-Open No. 2014-107935). The high average induces increase in switching loss of a power buffer circuit.

(ii) Second conventional technique: Apparently, Japanese Patent Application Laid-Open No. 2011-193678 suggests a method for obtaining a reactor current command on the basis of the maximum value and the minimum value of a detected both-end voltage to control an average of the both-end voltage. However, since such a control is significantly influenced by the ripple of a voltage output by a full-wave rectifying circuit, the responsiveness of a control system is inferior (see, for example, FIG. 10 of Japanese Patent Application Laid-Open No. 2014-107935).

(iii) Third conventional technique: In Japanese Patent Application Laid-Open No. 2014-107935, a reactor current command is obtained using an average of a both-end voltage as a voltage command to control the both-end voltage. Accordingly, the average is held constant, thus improving the responsiveness (see, for example, FIG. 6 of Japanese Patent Application Laid-Open No. 2014-107935).

However, in the first to third conventional techniques, an input current is estimated not from the both-end voltage themselves but from an average, the maximum value, and the minimum value of the both-end voltage. Thus, variations in electrostatic capacity of a buffer capacitor increase an error of the input current, which may cause variations in operating point of the both-end voltage.

This is expressed by an equation. According to the various documents above, it is known that the following Equation (1) holds by introducing an amplitude Im of an input current Iin to be input to a full-wave rectifying circuit, an amplitude Vm and an angular velocity ω of a single-phase AC voltage Vin (=Vm·sin(ωt), where t denotes a time) to be rectified by the full-wave rectifying circuit, an electrostatic capacity C of a buffer capacitor, and the maximum value Vcmax and the minimum value Vcmin of a both-end voltage.

$$Im = \frac{\omega \cdot C}{Vm}(Vc\max^2 - Vc\min^2) \tag{1}$$

Furthermore, the following Equation (2) holds by introducing an average Vavg (=(Vcmax+Vcmin)/2) of the both-end voltage (see, for example, Japanese Patent Application Laid-Open No. 2014-107935).

$$Im = \frac{\omega \cdot C}{Vm}\{2 \cdot Vavg \cdot (Vc\max - Vc\min)\} \tag{2}$$

Furthermore, a reactor current command il* is determined according to the following Equation (3) so that the input current Iin has a sinusoidal waveform and a power factor is 1 (that is, Iin=Im·sin(ωt)). Since the amplitude Im can be obtained from Equations (1) and (2) as described above, the reactor current command il* depends on the maximum value Vcmax and the minimum value Vcmin of the both-end voltage.

$$i1^* = Im \cdot |\sin(\omega t)| - \frac{Im}{2 \cdot |\sin(\omega t)|} \tag{3}$$

When a buffer capacitor is provided, it is known that the following Equation (4) holds by introducing a power Pout to be output by an inverter 5 and an both-end voltage Vc (see, for example, Ohnuma, Itoh, "Basic Investigation and Capacitance Reduction method of A Novel Single-Phase to Three-Phase Power Converter", The papers of Technical Meeting on Semiconductor Power Converter, IEE Japan, SPC-08-16 (2008)).

$$Vc = \sqrt{Vavg^2 - \frac{Pout}{\omega \cdot C} \cdot \sin(2\omega t)} \tag{4}$$

When the maximum value Vcmax of the both-end voltage Vc is fixed as a command value as according to the first conventional technique, the average Vavg of the both-end voltage Vc also varies according to variations in the power Pout subject to variations in a load. In contrast, when the average Vavg is fixed as a command value as according to the third conventional technique, a fluctuation (Vcmax−Vcmin) of the both-end voltage Vc varies.

Figure 5:
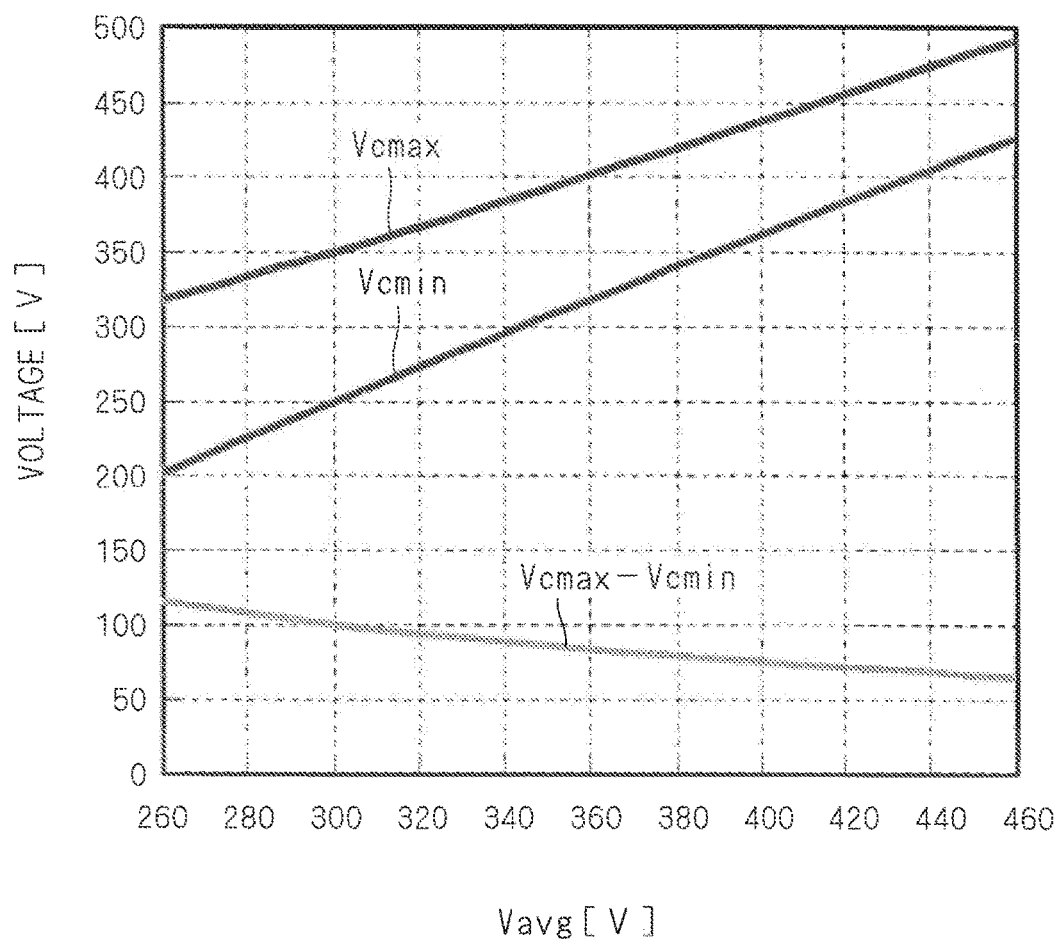
FIG. 5 is a graph indicating relationships between an average, the maximum value, the minimum value, and fluctuation of a both-end voltage of a buffer capacitor.

For example, FIG. 5 indicates relationships between the average Vavg, the maximum value Vcmax, the minimum value Vcmin, and the fluctuation (Vcmax−Vcmin) of the both-end voltage Vc when Vm=230·2 (V), Im=16·2 (A), Pout=3680 (W). When the amplitude Im indicated by Equations (1) and (2) is fixed, an operating point of the both-end voltage Vc is determined by the average Vavg, and the maximum value Vcmax, the minimum value Vcmin, or the fluctuation (Vcmax−Vcmin) according to these relationships. In other words, it is clear that setting of the operating point of the both-end voltage Vc is flexible.

In these first to third conventional techniques, when the electrostatic capacity of the buffer capacitor varies, it differs from the electrostatic capacity C to be adopted in Equations (1) and (2). Thus, when the amplitude Im is estimated by Equations (1) and (2), the reactor current command il* set by (3) is not suitable for the actual electrostatic capacity.

Figure 6:
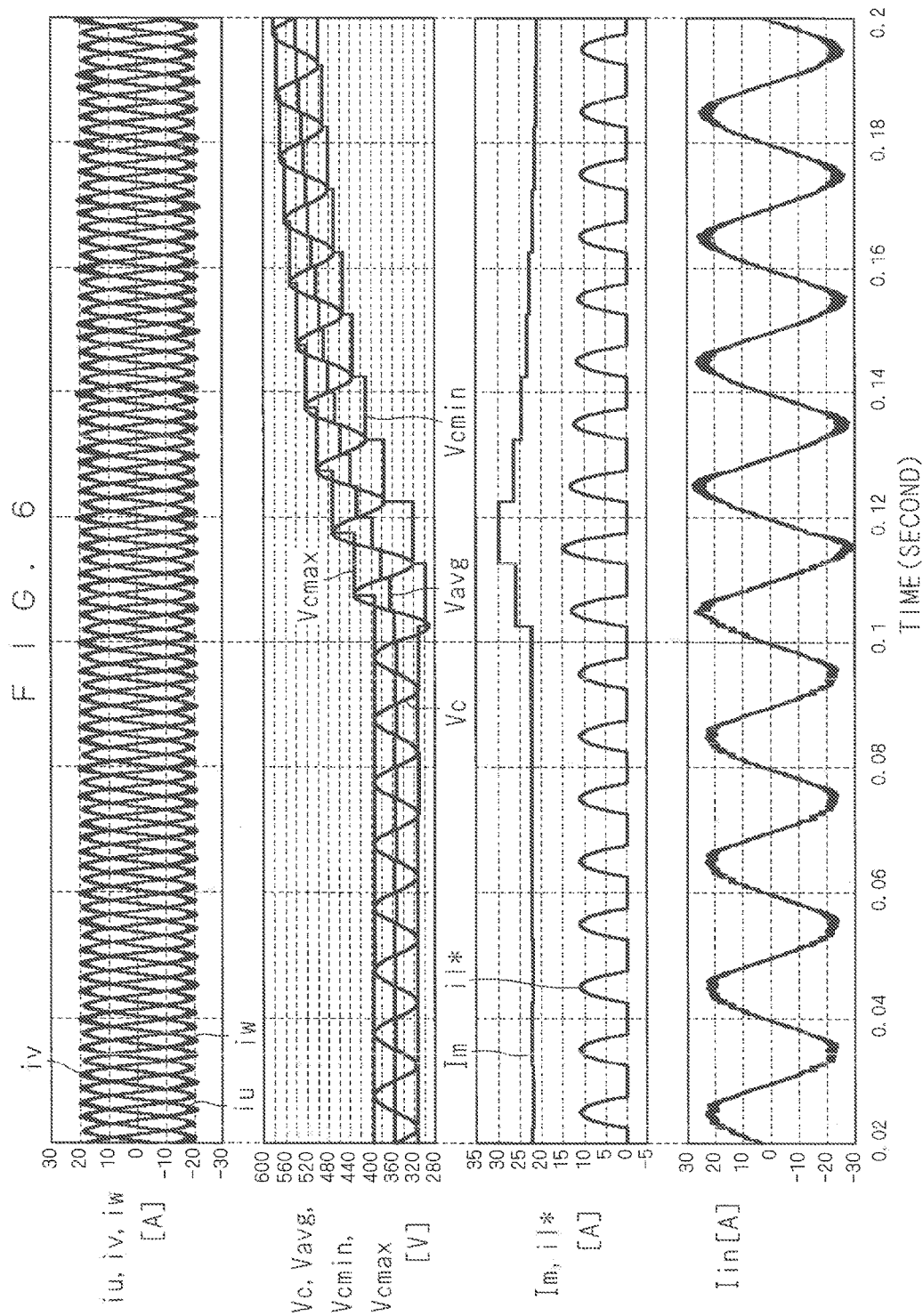
FIG. 6 is a graph indicating behaviors of various quantities in a technique corresponding to a technique of Japanese Patent Application Laid-Open No. 2014-107935 when an electrostatic capacity of the buffer capacitor decreases.

FIG. 6 is a graph indicating behaviors of various quantities in the third conventional technique (corresponding to the technique of Japanese Patent Application Laid-Open No. 2014-107935) when the actual electrostatic capacity of the buffer capacitor after 0.1 second decreases by 30% with respect to the electrostatic capacity before the 0.1 second. Assuming the load of the inverter as a three-phase balanced load, load currents iu, iv, and iw flowing through the load were used.

As understood from Equation (1), decrease in the actual electrostatic capacity of the buffer capacitor corresponds to an excess of the electrostatic capacity C to be used for calculation when the amplitude Im is estimated. Thus, the estimated value of the amplitude Im and the reactor current command il* become excessive, and the average Vavg also increases. Furthermore, the excess of the reactor current command il* induces increase in the amplitude Im of the input current Iin.

Since the average Vavg is maintained constant in Equation (2) according to the third conventional technique, the fluctuation (Vcmax−Vcmin) after 0.1 second increases (the difference between the maximum value Vcmax and the minimum value Vcmin suddenly increases in FIG. 6). Accordingly, increase in the average Vavg decreases the reactor current command il*, and then an equilibrium is reached.

However, the average Vavg after reaching the equilibrium is larger, and not only the buffer capacitor but also the switching elements included in the inverter require high breakdown voltages.

Figure 7:
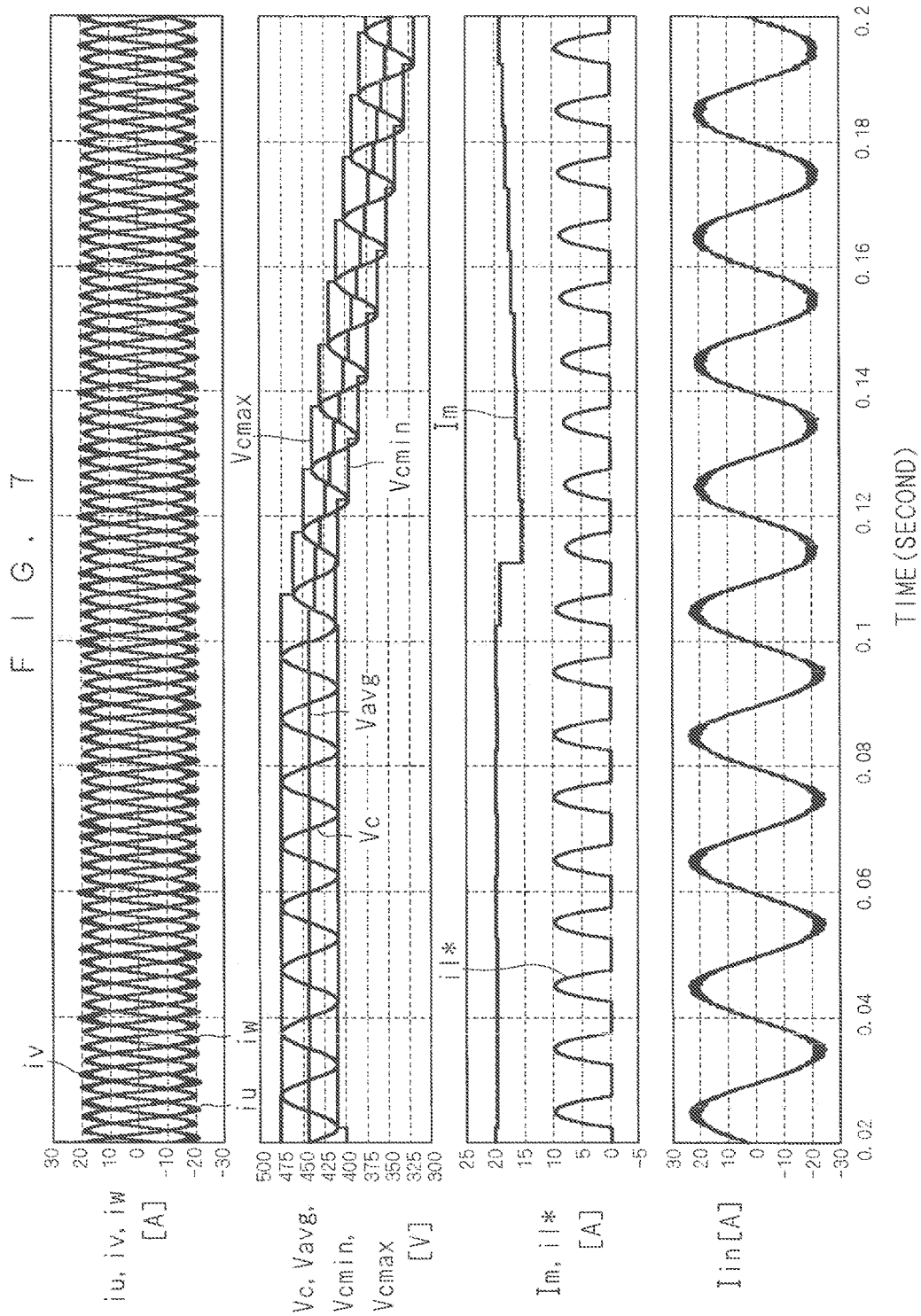
FIG. 7 is a graph indicating behaviors of various quantities in the technique corresponding to the technique of Japanese Patent Application Laid-Open No. 2014-107935 when the electrostatic capacity of the buffer capacitor increases.

FIG. 7 is a graph indicating behaviors of various quantities in the third conventional technique when the actual electrostatic capacity of the buffer capacitor after 0.1 second increases by 30% with respect to the electrostatic capacity before the 0.1 second.

Here, the average Vavg decreases by operations reverse to those performed in FIG. 6. However, decrease in the average Vavg diminishes the function of the boost chopper.

B. Basic Ideas of Technique to be Proposed

As seen in "A. Analysis of problems with conventional techniques", when the actual electrostatic capacity of the buffer capacitor varies under control of the both-end voltage Vc with detection of the maximum value Vcmax and the minimum value Vcmin, the influence on the reactor current command il* increases.

Although a command value (hereinafter referred to as an "average voltage command value) Vc* of an average of the both-end voltage Vc is given in a technique proposed by the present application, the average voltage command value Vc* is compared not with the average Vavg but with the both-end voltage Vc itself. Then, the amplitude Im is determined at least by performing proportional-integral control on a deviation ΔVc between the average voltage command value Vc* and the both-end voltage Vc.

Then, multiplication of a function (will be described in detail in each of the embodiments to be described later) determined according to the various modes in which a direct power converter is operated, by the amplitude Im determined on the basis of the deviation ΔVc yields a charge command (this charge command differs from the reactor current command il*, which will be described in "C. Structures of power converter and its control device" to be described later) as a basis of the reactor current command il*.

Accordingly, the reactor current command il* is appropriately determined according to the actual electrostatic capacity of the buffer capacitor, which differs from a case where the reactor current command il* is based on the amplitude Im estimated from Equations (1) and (2) depending on the electrostatic capacity C.

C. Structures of Power Converter and Its Control Device

FIG. 1 is a block diagram illustrating a structure of a direct power converter that can apply in common respective modes to be described in embodiments later. The direct power converter includes a converter 3, a power buffer circuit 4, an inverter 5, and a DC link 7.

The converter 3 is connected to a single-phase AC power source 1 through, for example, a filter 2. The filter 2 includes a reactor L2 and a capacitor C2. The reactor L2 is provided between the converter 3 and one of two output terminals of the single-phase AC power source 1. The capacitor C2 is provided between the two output terminals of the single-phase AC power source 1. The filter 2 removes a high-frequency component of a current. The filter 2 may be omitted. For the sake of simplicity, the function of the filter 2 is disregarded in the following description.

The DC link 7 includes DC power lines LH and LL.

For example, a diode bridge is used as the converter 3. The converter 3 includes diodes D31 to D34. The diodes D31 to D34 form a bridge circuit that single-phase full-wave rectifies a single-phase AC voltage Vin as an input voltage from the singe-phase AC power source 1 to convert the single-phase AC voltage Vin to a rectified voltage Vrec (=|Vin|), and outputs the rectified voltage between the DC power lines LH and LL. A potential higher than a potential applied to the DC power line LL is applies to the DC power line LH. An input current Iin flows from the single-phase AC power source 1 into the converter 3. Then, the converter 3 outputs a current irec (=|Iin|).

The power buffer circuit 4 includes a discharge circuit 4a and a charge circuit 4b, and provides and receives powers to and from the DC link 7. The discharge circuit 4a includes a capacitor C4 as a buffer capacitor, and the charge circuit 4b boosts the rectified voltage Vrec to charge the capacitor C4.

The discharge circuit 4a further includes a diode D42, and a transistor (here, an insulated gate bipolar transistor: hereinafter abbreviated as an "IGBT") Sc connected in antiparallel to the diode D42. The transistor Sc is connected in series with the capacitor C4 between the DC power lines LH and LL, where the transistor Sc is closer to the DC power line LH relative to the capacitor C4.

The antiparallel connection mentioned herein means parallel connection in which forward directions are opposite to each other. More specifically, the forward direction of the transistor Sc is a direction from the DC power line LL to the DC power line LH. The forward direction of the diode D42 is a direction from the DC power line LH to the DC power line LL. The transistor Sc and the diode D42 can collectively be understood as one switch element (switch Sc). When the switch Sc is conducting, the capacitor C4 discharges, and provides power to the DC link 7.

The charge circuit 4b includes, for example, a diode D40, a reactor L4, and a transistor (here, an IGBT) Sl. The diode D40 has a cathode and an anode. The cathode is connected between the switch Sc and the capacitor C4. This structure is known as a generally-called boost chopper.

The reactor L4 is connected between the DC power line LH and the anode of the diode D40. The transistor Sl is connected between the DC power line LL and the anode of the diode D40. The transistor Sl is connected in antiparallel to a diode D41. The transistor Sl and the diode D41 can collectively be understood as one switch element (switch Sl). Specifically, the forward direction of the transistor Sl is a direction from the DC power line LH to the DC power line LL. The forward direction of the diode D41 is a direction from the DC power line LL to the DC power line LH.

The capacitor C4 is charged by the charge circuit 4b to generate the both-end voltage Vc higher than the rectified voltage Vrec. Specifically, a current is caused to flow from the DC power line LH to the DC power line LL through the switch Sl to accumulate energy in the reactor L4. Then, the switch Sl is turned OFF, so that this energy is accumulated in the capacitor C4 through the diode D40.

The both-end voltage Vc is higher than the rectified voltage Vrec, so that a current basically does not flow into the diode D42. Thus, whether the switch Sc is conducting or non-conducting depends solely on whether the transistor Sc is conducting or non-conducting. Here, the diode D42 ensures a reverse breakdown voltage when the both-end voltage Vc is lower than the rectified voltage Vrec, and brings a current refluxing from an inductive load 6 to the DC link 7 into reverse conduction when the inverter 5 abnormally stops.

Furthermore, since the DC power line LH is higher in potential than the DC power line LL, a current basically does not flow into the diode D41. Thus, whether the switch Sl is conducting or non-conducting depends solely on whether the transistor Sl is conducting or non-conducting. Although the diode D41 is exemplified as a diode for bringing the reverse breakdown voltage or the reverse conduction and as a diode included in the transistor Sl to be materialized by an IGBT, the diode D41 itself does not contribute to any circuit operation.

The inverter 5 converts a DC voltage between the DC power lines LH and LL into an AC voltage and outputs the AC voltage to output terminals Pu, Pv, and Pw. The inverter 5 includes six switching elements Sup, Svp, Swp, Sun, Svn, and Swn. The switching elements Sup, Svp, and Swp are connected between the output terminals Pu, Pv, and Pw, respectively, and the DC power line LH. The switching elements Sun, Svn, and Swn are connected between the output terminals Pu, Pv, and Pw, respectively, and the DC power line LL. The inverter 5 forms a generally-called voltage source inverter, and includes six diodes Dup, Dvp, Dwp, Dun, Dvn, and Dwn.

Each of the diodes Dup, Dvp, Dwp, Dun, Dvn, and Dwn is arranged such that its cathode is directed toward the DC power line LH and its anode is directed toward the DC power line LL. The diode Dup is connected in parallel to the switching element Sup between the output terminal Pu and the DC power line LH. Likewise, the diodes Dvp, Dwp, Dun, Dvn, and Dwn are connected in parallel to the switching elements Svp, Swp, Sun, Svn, and Swn, respectively. The output terminals Pu, Pv, and Pw output the load currents iu, iv, and iw, respectively, which form a three-phase AC current. For example, IGBTs are used as the switching elements Sup, Svp, Swp, Sun, Svn, and Swn.

The inductive load 6 is, for example, a rotary machine, and is illustrated by an equivalent circuit representing an inductive load. Specifically, a reactor Lu and a resistor Ru are connected in series. One end of this series connection is connected to the output terminal Pu. This applies to a reactor Lv and a resistor Rv and to a reactor Lw and a resistor Rw. The opposite ends of these series connections are connected to each other.

When a control system is exemplified using the inductive load 6 as a synchronous machine, a velocity sensor 9 senses the load currents iu, iv, and iw that flow through the inductive load 6 and provides a control device 10 for the direct power converter with a rotational angular velocity ωm, a q-axis current Iq, and a d-axis current Id that are obtained on the basis of the load currents iu, iv, and iw.

The control device 10 receives an amplitude Vm of the single-phase AC voltage Vin, an angular velocity ω (or a phase θ=ωt that is a product of the angular velocity ω and a time t), a command value ωm* of the rotational angular velocity, a command value Vq* of a q-axis voltage, a command value Vd* of a d-axis voltage, the both-end voltage Vc, and a voltage Vl, besides the rotational angular velocity ωm, the q-axis current Iq, and the d-axis current Id. Here, the voltage Vl is a voltage to be applied to the reactor L4.

Figure 2:
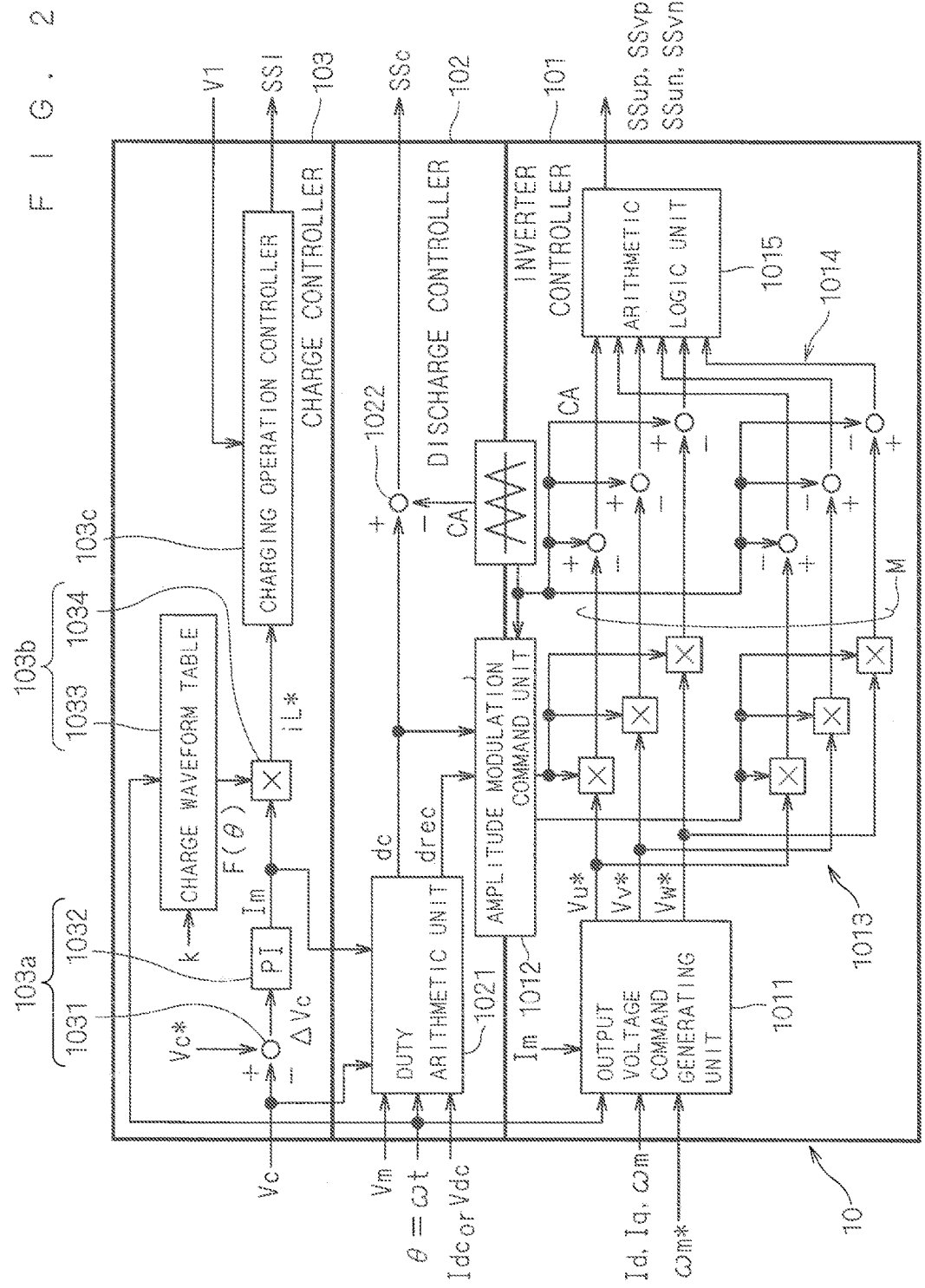
FIG. 2 is a block diagram exemplifying a structure of a control device according to the embodiments.

FIG. 2 is a block diagram exemplifying a structure of the control device 10. The control device 10 includes an inverter controller 101, a discharge controller 102, and a charge controller 103.

The inverter controller 101 outputs inverter control signals SSup, SSvp, SSwp, SSun, SSvn, SSwn, on the basis of a discharge duty dc and a rectifying duty drec, which will be described later in "D. Outline of operations of power buffer circuit 4", and command values Vu*, Vv*, and Vw* output by the inverter 5. The inverter control signals SSup, SSvp, SSwp, SSun, SSvn, and SSwn control operations of the switching elements Sup, Svp, Swp, Sun, Svn, and Swn, respectively.

The inverter controller 101 includes an output voltage command generating unit 1011 that generates the command values Vu*, Vv*, and Vw* on the basis of the phase θ=ωt, the q-axis current Iq, the d-axis current Id, and the rotational angular velocity ωm and its command value ωm*.

The inverter controller 101 further includes an amplitude modulation command unit 1012, a sum-of-products arithmetic unit 1013, a comparator 1014, and an arithmetic logic unit 1015.

The amplitude modulation command unit 1012 controls an operation of the sum-of-products arithmetic unit 1013 on the basis of the discharge duty dc and the rectifying duty drec. The sum-of-products arithmetic unit 1013 (illustrated only by multiplication signs for the sake of simplicity) calculates sums of products of the command values Vu*, Vv*, and Vw*, the discharge duty dc, and the rectifying duty drec to generate signal waves M. The comparator 1014 outputs results of comparison in value between the signal waves M and a carrier CA to the arithmetic logic unit 1015. The arithmetic logic unit 1015 performs logical operations on the results to output the inverter control signals SSup, SSvp, SSwp, SSun, SSvn, and SSwn.

The discharge controller 102 includes a duty arithmetic unit 1021 and a comparator 1022. The duty arithmetic unit 1021 receives, according to the various modes in which the direct power converter is operated, a DC voltage Vdc or a DC current Idc that can be used by the inverter 5 through the DC link 7 besides the phase θ, the amplitude Vm, and the both-end voltage Vc, and generates the discharge duty dc and the rectifying duty drec. Since the methods for generating the discharge duty dc and the rectifying duty drec differ according to the various modes in which the direct power converter is operated, the methods will be described in the respective embodiments to be described later.

The comparator 1022 compares the discharge duty dc with the carrier CA to generate a discharge signal SSc for bringing the switch Sc into conduction.

Since such operations by the inverter controller 101 and the comparator 1022 are based on known techniques (for example, Ohnuma, Itoh, "Circuit Configuration and Control Strategy of single-to-three Phase Power Converter with Active Buffer and Charge Circuit", The 2010 Annual Meeting of the Institute of Electrical Engineers of Japan, 4-057 (2010), Ohnuma, Itoh, "Experimental Verification of Single Phase to Three Phase Converter Using an Active Buffer circuit with a Charge Circuit", 2010 IEE—Japan Industry Applications Society Conference, 1-124 (2010) and Japanese Patent Application Laid-Open No. 2011-193678), the detailed operations are omitted herein.

However, in the following embodiments, the output voltage command generating unit 1011 sometimes requires the amplitudes Vm, the amplitude Im (determined on the basis of the deviation ΔVc as above), and a distribution factor k (0≤k≤1) to be described later in "D. Outline of operations of power buffer circuit 4" to generate the command values Vu*, Vv*, and Vw*.

The charge controller 103 includes an amplitude determining unit 103a, a charge command generating unit 103b, and a charging operation controller 103c.

The amplitude determining unit 103a includes a subtractor 1031 and a proportional integral controller 1032. The subtractor 1031 obtains the deviation ΔVc from the both-end voltage Vc and an average voltage command value Vc*. The proportional integral controller 1032 performs proportional-integral control on the deviation ΔVc to determine the amplitude Im. The amplitude Im influences the command values Vu*, Vv*, and Vw* which influence the operations of the inverter 5 that reduces the deviation ΔVc. Thus, at least the proportional-integral control on the deviation ΔVc suffices for determining the amplitude Im. Obviously, an element that performs proportional-integral-differential control may be used instead of the proportional integral controller 1032.

The charge command generating unit 103b includes a charge waveform table 1033 and a multiplier 1034. The charge waveform table 1033 receives the distribution factor k and the phase θ=ωt, and outputs a function F(θ) (=F(ωt)) on the phase θ. The multiplier 1034 multiplies the amplitude Im by the function F(ωt) to determine a charge command iL*. Since the function F(ωt) differs for each of the embodiments, it will be described individually in each of the embodiments.

The charging operation controller 103c controls an operation of the charge circuit 4b on the basis of the charge command iL*. More specifically, the charging operation controller 103c generates a charge switch signal SSl for controlling the switch Sl so that the reactor current il flowing through the reactor L4 is equal to the reactor current command il* corresponding to the charge command iL*. Since the voltage Vl is necessary to generate this charge switch signal SSl, it is input to the charging operation controller 103c.

The charging operation controller 103c functions as, for example, a critical mode modulator that generates the charge switch signal SSl so that the reactor current il flows in the critical mode. In Ohnuma, Itoh, "Experimental Verification of Single Phase to Three Phase Converter Using an Active Buffer circuit with a Charge Circuit", 2010 IEE—Japan Industry Applications Society Conference, 1-124 (2010), the value of the inductance of the reactor L4 is limited on the premise that the reactor current il flows in the discontinuous mode. However, according to the technique proposed by the present application, even when the inductance varies from the limits and influences the both-end voltage Vc, the operation of the amplitude determining unit 103a accommodates the influence of variations.

With such structures, the technique described in "B. Basic ideas of technique to be proposed" can be embodied.

D. Outline of Operations of Power Buffer Circuit 4

Instantaneous input power Pin to be input to the converter 3 is expressed by the following Equation (5) with an input power factor 1.

$$Pin = Vm \cdot Im \cdot \sin^2(\omega t) \quad (5)$$
$$= \frac{Vm \cdot Im}{2} - \frac{Vm \cdot Im}{2} \cdot \cos(2\omega t)$$

The instantaneous input power Pin has an AC component $(-\frac{1}{2}) \cdot Vm \cdot Im \cdot \cos(2\omega t)$ (hereinafter may be referred to as an "AC component Pin^") indicated by the second term in the right side of Equation (5). Thus, the instantaneous input power Pin may be hereinafter referred to as ripple power Pin.

The power converter illustrated in FIG. 1 can be understood as follows.

The converter 3 receives the single-phase AC voltage Vin, and outputs the ripple power Pin. The power buffer circuit 4 receives receiving power Pl from the DC link 7, and outputs providing power Pc to the DC link 7. The inverter 5 receives input power Pdc (=Pin+Pc−Pl) obtained by subtracting the receiving power Pl from a sum of the ripple power Pin and the providing power Pc, and outputs the load currents iu, iv, and iw. If the loss of the inverter 5 is disregarded, the input power Pdc is equal to the power Pout (see Equation (4)).

FIG. 3 is a block diagram schematically illustrating the balance of power in the direct power converter illustrated in FIG. 1. The power subjected to buffering (hereinafter referred to as "buffering power Pbuf") is equal to a power difference (Pc−Pl) obtained by subtracting the receiving power Pl from the providing power Pc. Furthermore, power Prec transferred from the converter 3 to the inverter 5 is equal to (Pin−Pl). Thus, Pdc=Prec+Pc holds.

A distribution factor k is introduced into the next Equation (6).

$$Pdc = \frac{Vm \cdot Im}{2} - (1-k) \cdot \frac{Vm \cdot Im}{2} \cdot \cos(2\omega t) \quad (6)$$

In other words, when k=0, the inverter 5 receives the ripple power Pin as it is in as the input power Pdc from the DC link 7. This means Pbuf=0 which corresponds to a case where no power is distributed to the power buffer circuit 4. When k=1, Pdc=Pin−Pin^ holds. This corresponds to a case where the power buffer circuit 4 provides and receives to and from the DC link 7 powers of the absolute value |Pin^| of the AC component Pin^.

In other words, the distribution factor k indicates a level of the absolute value |Pin^| of the AC component Pin^ to be distributed to the power buffer circuit 4 as the buffering power Pbuf.

E. Equivalent Circuit of Direct Power Converter and Various Duties

FIG. 4 illustrates an equivalent circuit of the direct power converter illustrated in FIG. 1. The equivalent circuit is introduced by, for example, Ohnuma, Itoh, "Experimental Verification of Single Phase to Three Phase Converter Using an Active Buffer circuit with a Charge Circuit", 2010 IEE—Japan Industry Applications Society Conference, 1-124 (2010). Japanese Patent Application Laid-Open No. 2011-193678, Japanese Patent No. 5454732 and Japanese Patent Application Laid-Open No. 2014-96976. In the equivalent circuit, a current irec1 is shown equivalently as the current irec1 flowing through a switch Srec when the switch Srec is conducting. Likewise, a discharge current ic is shown equivalently as the discharge current ic flowing through the switch Sc when the switch Sc is conducting.

Furthermore, a current flowing into the inductive load 6 through the inverter 5 when the output terminals Pu, Pv, and Pw are commonly connected to one of the DC power lines LH and LL in the inverter 5 is also shown equivalently as a zero current iz flowing through a switch Sz when the switch Sz is conducting.

Furthermore, FIG. 4 shows the reactor L4, the diode D40, and the switch Sl that are included in the charge circuit 4b, and the current il flowing through the reactor L4.

Then, duties drec, dc, and dz in which the switches Srec, Sc, and Sz are brought into conduction, respectively, are introduced in the equivalent circuit thereby formed. As known by the documents above, 0≤drec≤1, 0≤dc≤1, 0≤dz≤1, and drec+dc+dz=1 hold.

Since the duty drec is a duty for setting a period during which the converter 3 is connected to the DC link 7 to allow a current to flow through the inverter 5, it is the rectifying duty drec.

Since the duty dc is a duty at which the capacitor C4 discharges, it is the discharge duty dc.

Since the duty dz is a duty at which the zero current iz always flows irrespective of an output voltage in the inverter 5, it may be called a zero duty dz.

Since the currents irec1, ic, and iz are obtained by multiplying the duties drec, dc, and dz, respectively, by the DC current Idc to be input to the inverter 5, the currents irec1, ic, and iz are averages in switching periods of the switches Srec, Sc, and Sz, respectively. Thus, the duties drec, dc, and dz can be regarded as current distribution factors of the DC current Idc relative to the currents irec1, ic, and iz, respectively.

When a diode bridge is used as the converter 3, the converter 3 cannot actively perform a switching operation in the rectifying duty drec. Thus, the inverter 5 and the switch Sc perform a switching operation at the zero duty dz and the discharge duty dc, respectively, thus obtaining the current irec1.

During a period in which the zero current iz flows, the inverter 5 cannot use a DC voltage in the DC link 7. Thus, the DC voltage in the DC link 7 to be used in supplying power to the inverter 5 is significant in converting power. In other words, the instantaneous DC voltage that is not used by the inverter 5 for power conversion is meaningless even in considering a voltage utilization factor. The DC voltage Vdc significant in converting power can be expressed by Equation (7) below.

$$Vdc = Vrec \cdot drec + Vc \cdot dc + 0 \cdot dz \tag{7}$$

In contrast, the DC voltage Vdc can be understood as a voltage to be applied to the DC link 7 as an average of the maximum values of the voltage that the inverter 5 can output in a period during which switching of the switches Sc and Sl and the inverter 5 is controlled. This is because the inverter 5 is insulated from one of the DC power lines LL and LH during a period corresponding to the zero duty dz, though the inverter 5 may contribute to the voltage at the DC link 7 at a ratio indicated by the zero duty dz.

In FIG. 4, the DC voltage Vdc is shown as a voltage across a current source Idc (that supplies the DC current Idc) representing the inverter 5 and a load of the inverter 5.

Hereinafter, the various modes in which the direct power converter is operated will be specifically described.

F. First Embodiment

The first embodiment will be described in comparison with the operations of the direct power converter introduced by Japanese Patent Application Laid-Open No. 2014-107935.

In the technique disclosed by Japanese Patent Application Laid-Open No. 2014-107935, different controls have been alternately performed per quarter period (¼ period) of the single-phase AC voltage Vin (hereinafter, such a control will be also referred to as "quarter period control" for convenience) to cancel out the AC component Pin^. Specifically, a control where Pl=Pin^ and Pc=0 and a control where Pl=0 and Pc=Pin^ have been alternately performed per quarter period of the single-phase AC voltage Vin. Accordingly, Pdc=Pin+Pc−Pl=Pin−Pin^=(½)·Vm·Im holds during all the periods, and the power ripple has been avoided. This holds when k=1 in Equation (6).

In the present application, a period during which the receiving power Pl is received from the DC link 7 (a period during which a cosine value cos (2ωt) that is a cosine of a value twice a phase ωt is negative) is called a receiving period, and a period during which the providing power Pc is provided to the DC link 7 (a period during which the cosine value cos (2ωt) is positive) is called a providing period, similarly as Japanese Patent Application Laid-Open No. 2014-107935.

(f-1) Setting of Duty

In Japanese Patent Application Laid-Open No. 2014-107935, the discharge duty dc is set by the next Equation (8), and the reactor current il* is determined by Equation (3) using this discharge duty dc and on the premise that the input current Iin has a sinusoidal waveform. Here, the DC current Idc can be set as a command value.

$$dc = \begin{cases} 0 \text{(receiving period)} \\ \dfrac{Vm \cdot Im}{2 \cdot Vc \cdot Idc} \cdot \cos(2\omega t) \text{(providing period)} \end{cases} \tag{8}$$

Furthermore, the rectifying duty drec is set by the next Equation (9), thus allowing the DC voltage Vdc to have a constant value (for example, Japanese Patent Application Laid-Open No. 2011-193678).

$$drec = \begin{cases} \dfrac{Im}{2 \cdot Idc \cdot |\sin(\omega t)|} \text{(receiving period)} \\ \dfrac{Im}{Idc} \cdot |\sin(\omega t)| \text{(providing period)} \end{cases} \tag{9}$$

In the first embodiment, the duty arithmetic unit 1021 generates the duties dc and drec according to Equations (8) and (9), respectively, using the amplitude Im obtained from the amplitude determining unit 103a as the amplitude Im in Equations (3), (8), and (9). In other words, the duty arithmetic unit 1021 receives the amplitudes Vm and Im, the DC current Idc, and the phase ωt in the first embodiment.

However, the input power Pdc to be input to the inverter 5 from the DC link 7 is equal to a product of the DC voltage Vdc and the DC current Idc. Since the inverter 5 receives the input power Pdc (=Pin+Pc−Pl) obtained by subtracting the receiving power Pl from a sum of the ripple power Pin and the providing power Pc, Equation (10) below holds.

$$Idc = \dfrac{Pin + Pc - Pl}{Vdc} = \dfrac{Vm \cdot Im}{2 \cdot Vdc} \tag{10}$$

Thus, Equations (8) and (9) may be modified into Equations (11) and (12), respectively. The DC voltage Vdc may be input to the duty arithmetic unit 1021 as a command value, instead of the DC current Idc.

$$dc = \begin{cases} 0 \text{(receiving period)} \\ \dfrac{Vdc}{Vc} \cdot \cos(2\omega t) \text{(providing period)} \end{cases} \tag{11}$$

$$drec = \begin{cases} \dfrac{Vdc}{Vm} \cdot \dfrac{1}{|\sin(\omega t)|} \text{(receiving period)} \\ \dfrac{2 \cdot Vdc}{Vm} \cdot |\sin(\omega t)| \text{(providing period)} \end{cases} \tag{12}$$

(f-2) Reactor current il

In the critical mode, the reactor current il rises from 0 to a peak value during a period ΔT1 during which the switch Sl is conducting, and drops from the peak value to 0 during a period ΔT2 during which the switch Sl is non-conducting. Such periods ΔT1 and ΔT2 are alternately set. When these rise and drop approximate linear change in the time, the reactor current il that is half the peak value flows in average.

Considering that the rectified voltage Vrec=|Vin|=Vm·|sin(ωt)| is applied to the power buffer circuit 4, the period ΔT1 is expressed by Equation (13) below to which an inductance L of the reactor L4 is introduced.

$$\Delta T1 = \dfrac{2 \cdot il \cdot L}{Vm \cdot |\sin(\omega t)|} \tag{13}$$

Thus, the period $\Delta T1$ during which the switch S1 is conducting is determined by Equation (14) using the reactor current command iL* expressed by Equation (3) as the reactor current il in Equation (13).

$$\Delta T1 = \frac{2 \cdot L}{Vm} \cdot Im \cdot \left(1 - \frac{1}{2 \cdot \sin^2(\omega t)}\right) \quad (14)$$

In Equation (14), the amplitude Im can be obtained from the amplitude determining unit 103a, and the coefficient 2·L/Vm can be regarded as a proportional gain for a voltage control system. Thus, once the charge command iL* to be expressed by Equations (15) is determined, the period $\Delta T1$ is determined by voltage feedback control.

$$iL^* = Im \cdot F1(\omega t) \quad (15)$$
$$F1(\omega t) = 1 - \frac{1}{2 \cdot \sin^2(\omega t)}$$

Here, the function F1($\omega t$) is the same as the function F($\omega t$) above, and is a function of the phase $\theta(=\omega t)$ to be used in the first embodiment. As described in "B. Basic ideas of technique to be proposed", the charge command iL* is determined by a product of the amplitude Im and the function F1 ($\omega t$).

Then, the function F1 ($\omega t$) is determined according to the discharge duty dc determined by Equation (8) or (11), the rectifying duty drec determined by Equation (9) or (12), and the distribution factor k that is equal to 1.

The charging operation controller 103c operates a counter until reaching the charge command iL*, and converts the counted value into the period $\Delta T1$, of the charge switch signal SS1 (during which the switch S1 is conducting). The conversion factor of the counter also functions as a proportional gain for a voltage control system, similarly as the coefficient 2·L/Vm.

When the period $\Delta T1$ starts to be counted for the charge switch signal SS1 is the timing when the switch S1 is turned ON, which is triggered by the voltage Vl decreasing to 0 that is to be applied to the reactor L4. This is because the switch S1 may be switched from OFF to ON in the critical mode when the reactor current il decreases to 0 and because the timing with which the reactor current il decreases to 0 can be regarded as the timing with which the voltage Vl decreases to 0.

(f-3) Advantages

Figure 8:
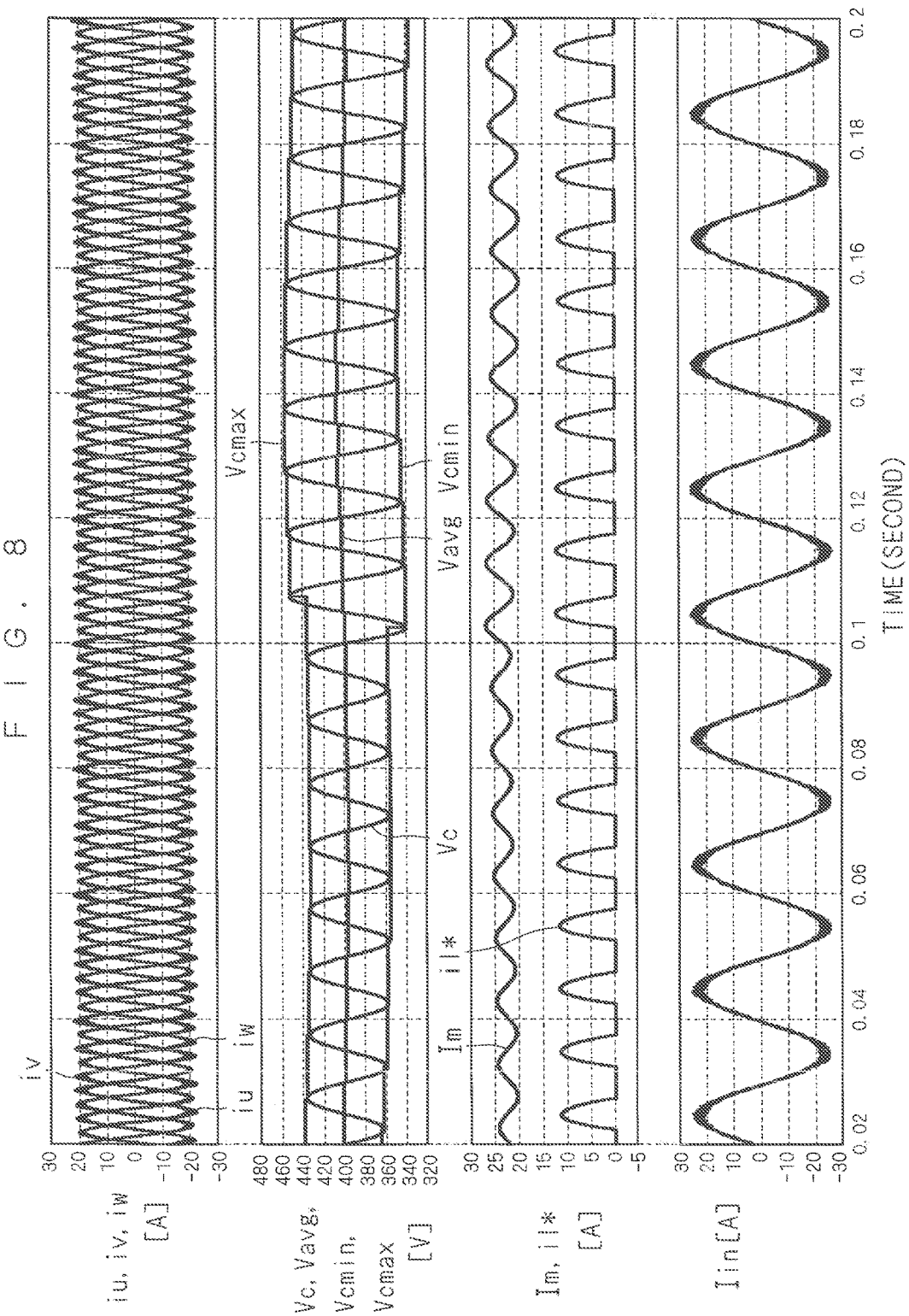
FIG. 8 is a graph indicating behaviors of various quantities in a first embodiment when the electrostatic capacity of the buffer capacitor decreases.
Figure 9:
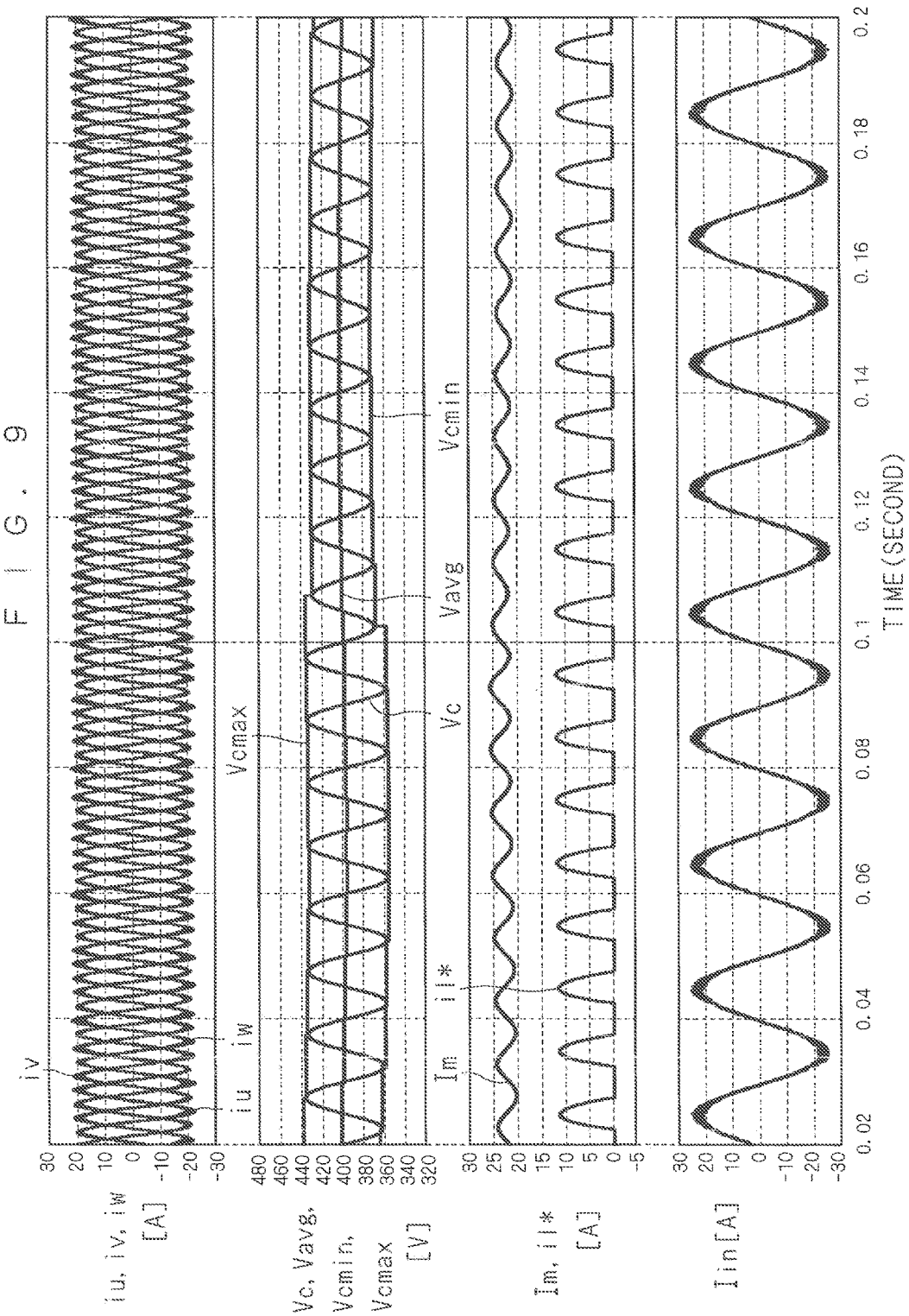
FIG. 9 is a graph indicating behaviors of various quantities ill the first embodiment when the electrostatic capacity of the buffer capacitor increases.

FIGS. 8 and 9 are graphs each indicating behaviors of various quantities when the technique proposed by the first embodiment is adopted. FIG. 8 indicates a case where the actual electrostatic capacity of the buffer capacitor after 0.1 second decreases by 30% with respect to the electrostatic capacity before the 0.1 second, and FIG. 9 indicates a case where the actual electrostatic capacity of the buffer capacitor after 0.1 second increases by 30% with respect to the electrostatic capacity before the 0.1 second.

As understood from the comparison between FIGS. 8 and 6 and the comparison between FIGS. 9 and 7, although variations in the fluctuation Vc (Vcmax−Vcmin) remain, variations in the amplitude Im and in the peak value of the reactor current command iL* according to the technique proposed by the first embodiment are smaller than those when the technique of Japanese Patent Application Laid-Open No. 2014-107935 has been adopted. The average of the amplitudes Im is approximately 23 A.

In order to reduce variations in the amplitude Im, the responsiveness of the charge controller 103 is preferably less than or equal to one tenth of a value twice the frequency ($\omega/(2\pi)$) of the single-phase AC voltage Vin. More specifically, the control bandwidth of the amplitude determining unit 103a, particularly, of the proportional integral controller 1032 is preferably less than or equal to one tenth of the fundamental frequency of the rectified voltage Vrec. This is because variations in the amplitude Im decrease at 20 dB/dec according to decrease in the control bandwidth.

As described above according to the first embodiment, even when the actual electrostatic capacity of the buffer capacitor varies, variations in the peak value of the reactor current command iL* are suppressed and thus prominent variations in the both-end voltage Vc are avoided.

G. Second Embodiment

The second embodiment will describe a case where the distribution factor k, the rectifying duty drec, and the discharge duty dc are different in value from those used in the first embodiment.

The discharge duty dc and the rectifying duty drec expressed by Equations (11) and (12) allow the DC voltage Vdc to be constant. This can be understood from the fact that Equation (7) identically holds in consideration of Vrec=Vm·|sin($\omega t$)|.

However, during drec≤1 and a providing period, |sin($\omega t$)|≤1/√2 holds. Thus, as seen from the rectifying duty during the providing period in the right side of Equation (12), as long as the DC voltage Vdc is maintained constant, the value never exceed 1/√2 of the amplitude Vm.

The second embodiment introduces a technique for improving a ratio R of the DC voltage Vdc to the amplitude Vm (hereinafter referred to as a "voltage utilization factor") by adopting the next Equation (16) expressing the DC voltage Vdc, thus indicating a function F2 ($\omega t$) that is a function F ($\omega t$) when the technique is adopted.

$$Vdc = \begin{cases} Vm \cdot |\sin(\omega t)| & \text{(receiving period)} \\ Vm \cdot |\cos(\omega t)| & \text{(providing period)} \end{cases} \quad (16)$$

The following description will describe, in order, the probability that the voltage utilization factor R may exceed 1/√2 by setting the DC voltage Vdc through Equation (16), existence of the rectifying duty drec and the discharge duty dc for (though approximately) obtaining the DC voltage Vdc, and the reactor current command iL* and the function F2 ($\omega t$) when the DC voltage Vdc is set.

(g-1) Improvement in Voltage Utilization Factor R

An average Ra of the voltage utilization factors R during a receiving period is obtained from the next Equation (17). Furthermore, since each phase difference between the providing period and the receiving period and between a sinusoidal waveform and a cosine waveform is $\pi/2$, the average Ra during the providing period is equal to that during the receiving period.

$$Ra = \frac{1}{Vm} \cdot \frac{1}{\pi/2} \cdot \int_{\pi/4}^{3\pi/4} Vm \cdot |\sin(\omega t)| \, d(\omega t) \quad (17)$$

-continued $$= \frac{2\sqrt{2}}{\pi} = \frac{4}{\pi} \cdot \frac{1}{\sqrt{2}}$$

Thus, during any of the providing period and the receiving period, the voltage utilization factors R have been improved in average to $4/\pi(>1)$ times that indicated in the first embodiment.

(g-2) Setting of Duty

According to the second embodiment, drec=1 and dc=0 hold during the receiving period. Such rectifying duty drec and discharge duty dc satisfy and can set respective conditions applied thereto, that is, 0≤drec≤1, 0≤dc≤1, and drec+dc+dz=1.

Accordingly, a result of the calculation of the right side of Equation (7) is equal to the right side for the receiving period in Equation (16).

During the providing period, the rectifying duty drec and the discharge duty dc are set by Equation (18) and Equation (19), respectively.

$$drec = \sqrt{2} \cdot |\sin(\omega t)| \text{(providing period)} \tag{18}$$

$$dc = \frac{Vm}{Vc} \cdot \cos(2\omega t) \text{(providing period)} \tag{19}$$

Since $0 \leq |\sin(\omega t)| \leq 1/\sqrt{2}$ holds during the providing period, the rectifying duty drec set by Equation (18) satisfies the condition 0≤drec≤1 applied thereto. Furthermore, since $0 \leq \cos(2\omega t) \leq 1$ holds during the providing period, the discharge duty dc set by Equation (19) satisfies 0≤dc≤1, and drec+dc+dz=1 by increasing the both-end voltage Vc more than the amplitude Vm. For the following convenience, a voltage ratio α=Vc/Vm is introduced herein.

The DC voltage Vdc during the providing period can be obtained from the next Equation (20) by setting the rectifying duty drec and the discharge duty dc as described above.

$$Vrec \cdot drec + Vc \cdot dc + 0 \cdot dz = Vm \cdot \sqrt{2} \cdot \sin^2(\omega t) + Vm \cdot \cos(2\omega t) \tag{20}$$

$$= \frac{Vm}{\sqrt{2}} [1 + (\sqrt{2} - 1) \cdot \cos(2\omega t)]$$

Equation (20) approximates Equation (16) well when, for example, the phase ωt takes a value ranging from $3\pi/4$ to $5\pi/4$ during the providing period. Specifically, it is known that a difference in integral value over the providing period between the DC voltage Vdc expressed by Equation (16) and the DC voltage Vdc expressed by Equation (20) is less than 1%.

As described above, satisfying dc=dz=0 during the receiving period and using the duty drec and the duty dc expressed by Equation (18) and Equation (19) allow the waveforms of the DC voltage Vdc to be approximated to the ones expressed by Equation (16), thus improving the voltage utilization factors R.

(g-3) Reactor Current il

During the providing period, the discharge duty dc expressed by Equation (19) adopted in the second embodiment is Vm/Vdc times that in Equation (11) adopted in the first embodiment. Since Vdc/Vm=$2\sqrt{2}/\pi$ holds in the second embodiment as clarified from Equation (17), the discharge duty dc according to the second embodiment is $\pi/(2\sqrt{2})$ times that according to the first embodiment.

Thus, the amount of charge to be provided to the DC link 7 by the discharge current is during the providing period according to the second embodiment is $k \cdot \pi/(\sqrt{2})$ times that according to the first embodiment in consideration of the distribution factor k. Thus, the reactor current il flowing during the receiving period has to be $k \cdot \pi/(2\sqrt{2})$ times that according to the first embodiment. Thus, the reactor current command il* is set by the next Equation (21) in consideration of Equation (3).

$$il^* = \text{Im} \cdot \left( |\sin(\omega t)| - \frac{1}{2 \cdot |\sin(\omega t)|} \right) \cdot k \cdot \frac{\pi}{2\sqrt{2}} \tag{21}$$

Thus, Equations (22) yield the function F2 (ωt) in the second embodiment from Equations (15) and (21).

$$iL^* = \text{Im} \cdot F2(\omega t) \tag{22}$$

$$F2(\omega t) = F1(\omega t) \cdot \frac{k \cdot \pi}{2\sqrt{2}}$$

$$= \frac{k \cdot \pi}{2\sqrt{2}} \left[ 1 - \frac{1}{2 \cdot \sin^2(\omega t)} \right]$$

The function F2 (ωt) is determined according to the distribution factor k, the discharge duty dc which is determined at value 0 during the receiving period and determined by Equation (19) during the providing period, and the rectifying duty drec which is determined at value 1 during the receiving period and determined by Equation (18) during the providing period.

As seen from the current irec indicated by FIGS. 10 and 11 to be described later, a sinusoidal waveform of the input current Iin as the basis of Equation (3) does not hold in the second embodiment. Thus, strictly speaking, application of Equation (3) is not rational to obtain Equations (22).

However, in consideration of the overall receiving period, Equation (3) holds even when the input current Iin does not have a sinusoidal waveform. Thus, the function F2 (ωt) may be determined with the input current Iin having a sinusoidal waveform also according to the second embodiment.

In other words, considering that the reactor current il flows only during the receiving period, a product of the rectified voltage Vrec and the reactor current command il* expressed by Equation (3) suffices the AC component Pin^.

Calculating the product yields the next Equation (23), thus clarifying that the product Vrec·il* is equal to the AC component Pin^.

$$Vrec \cdot il^* = Vm \cdot |\sin(\omega t)| \cdot \text{Im} \cdot \left( |\sin(\omega t)| - \frac{1}{2 \cdot \sin(\omega t)} \right) \tag{23}$$

$$= Vm \cdot \text{Im} \cdot \left[ \sin^2(\omega t) - \frac{1}{2} \right]$$

$$= -\frac{Vm \cdot \text{Im}}{2} \cdot \cos(2\omega t)$$

Since Equations (6) and (10) hold independent of the rectifying duty drec and the discharge duty dc, the DC current Idc is obtained from the next Equation (24) using Equations (6) and (10) also in the second embodiment. Here, the DC voltage Vdc is approximated by Equation (16).

$$Idc = \frac{Pdc}{Vdc} = \frac{Vm \cdot \text{Im}}{2 \cdot Vdc}[1 - (1-k) \cdot \cos(2\omega t)] \quad (24)$$

Accordingly, the charge command iL* can be obtained using the function F2 (ωt) according to the second embodiment similarly as the function F1 (ωt) according to the first embodiment. Furthermore, the prominent variations in the both-end voltage Vc are avoided even when the actual electrostatic capacity of the buffer capacitor varies similarly as in the first embodiment.

(g-4) Behaviors of Various Quantities

Figure 10:
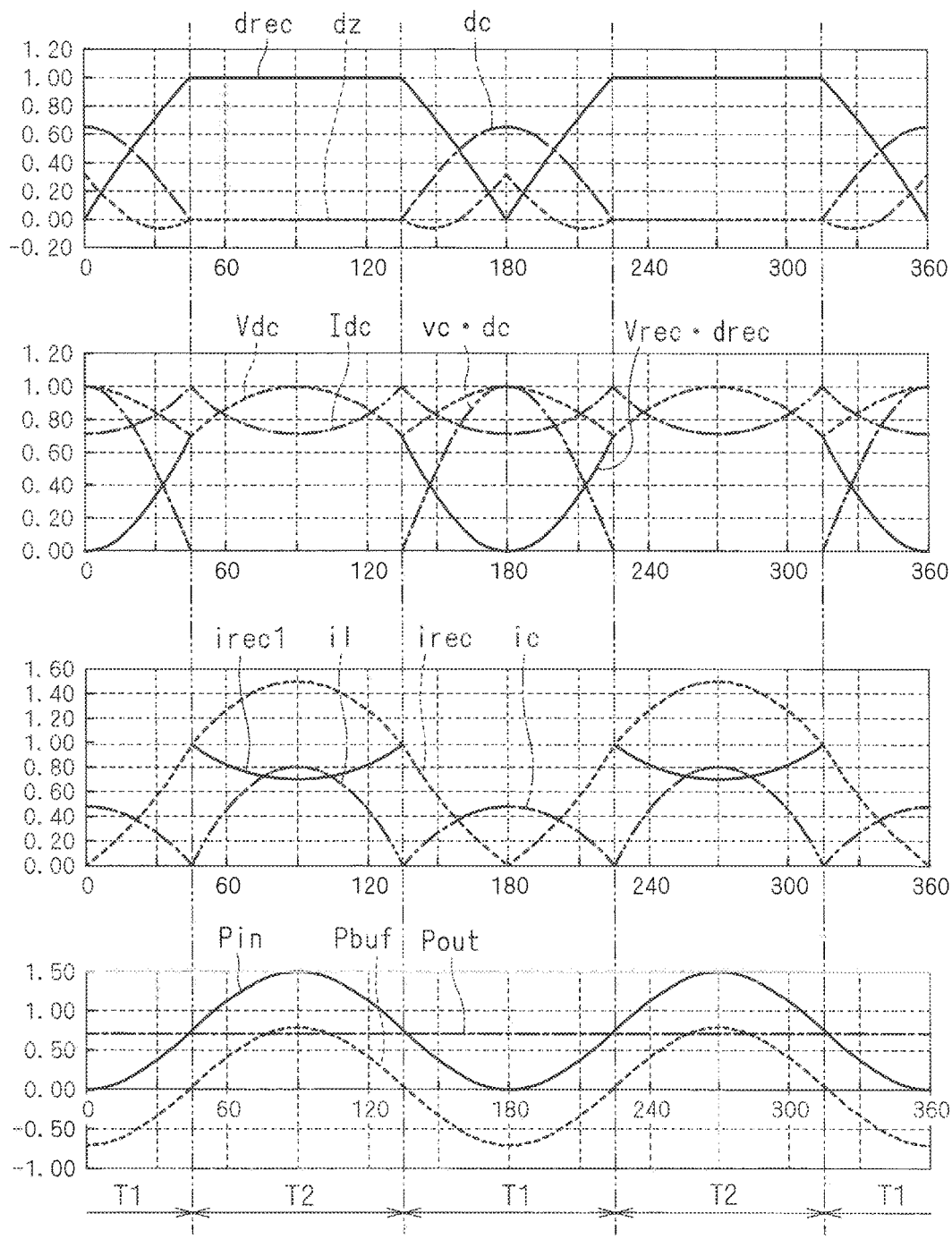
FIG. 10 is a graph indicating operations of a direct power converter according to a second embodiment.
Figure 11:
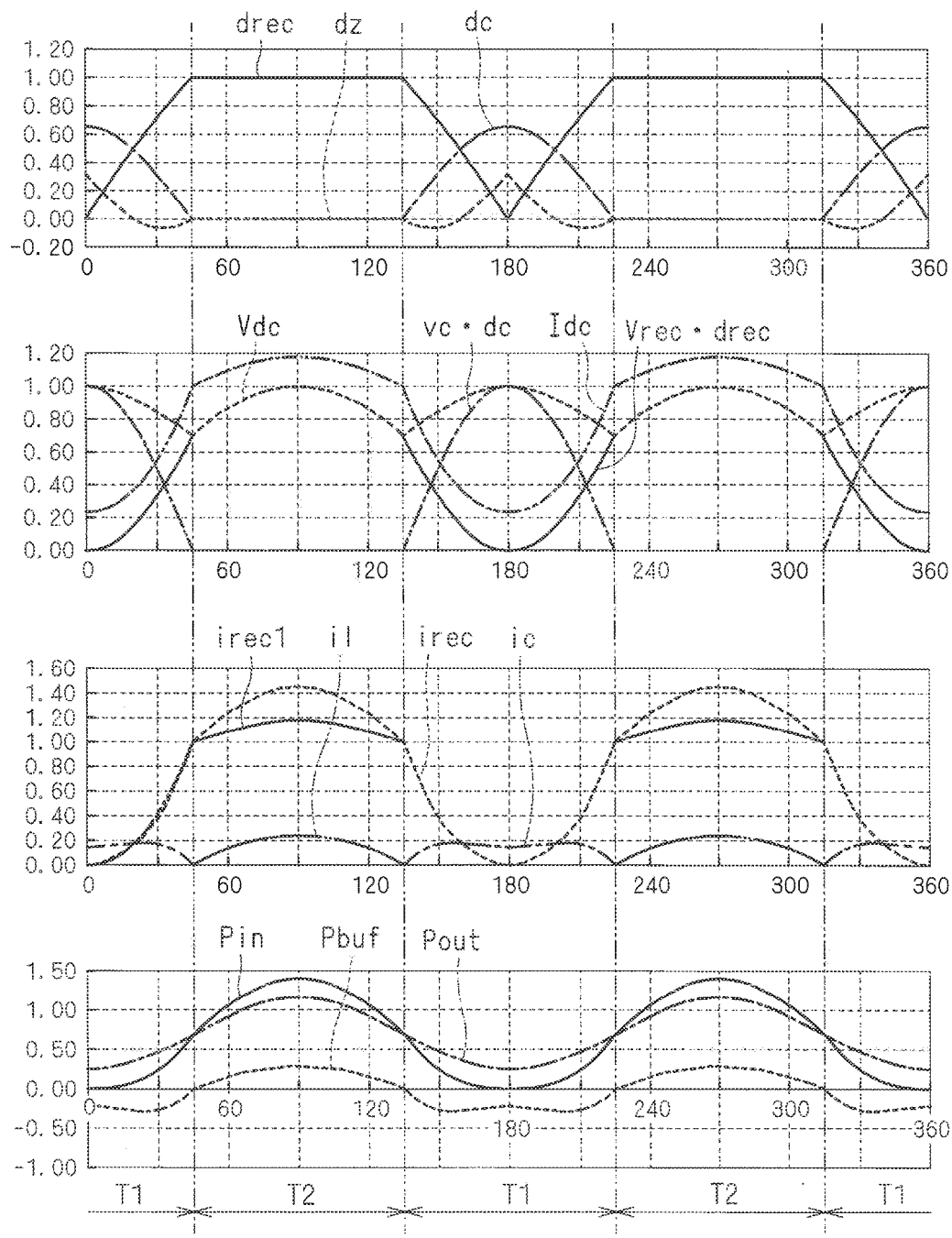
FIG. 11 is a graph indicating the operations of the direct power converter according to the second embodiment.

FIGS. 10 and 11 are graphs each representing operations of the direct power converter illustrated in FIG. 1 when the duties drec, dc, and dz are set according to the second embodiment. FIG. 10 illustrates a case where k=1, whereas FIG. 11 illustrates a case where k=⅓.

In both FIGS. 10 and 11, the topmost tier illustrates the duties drec, dc, and dz, the tier second from the top illustrates the DC voltage Vdc (see Equation (16)), the voltages Vrec·drec and Vc·dc (see Equation (7)) that are included in the DC voltage Vdc, and the DC current Idc (see Equation (24)), the tier third from the top illustrates the currents irec, ic, il, and irec1, and the bottom tier illustrates the instantaneous powers Pin, Pout, and Pbuf. Furthermore, the symbols T1 and T2 denote the providing period and the receiving period, respectively.

In both FIGS. 10 and 11, the horizontal axis represents the phase ωt using "degree" as the unit. Furthermore, the currents Idc, irec, ic, il, and irec1 have been converted using the amplitude Im as √2. The voltages Vrec·drec and Vc·dc have been converted using the amplitude Vm as 1, and α=1.5 was set. The instantaneous powers Pin, Pout, and Pbuf are obtained as respective products of the voltages and the currents that have been converted as above. Since the reactor current il is zero during the providing period T1, the current irec1 matches the current irec. With dc=0 during the receiving period T2, the voltage Vrec·drec matches the DC voltage Vdc.

Since the duties drec and dc do not depend on the distribution factor k as described above, the DC voltage Vdc and the voltages Vrec·drec and Vc·dc that are included in the DC voltage Vdc have the same waveforms in both FIGS. 10 and 11.

However, since the DC current Idc is expressed by Equation (24) and depends on the distribution factor k, it largely differs between k=1 in FIG. 10 and k=⅓ in FIG. 11.

The currents ic and il in the tier third from the top in FIG. 11 where k=⅓ are reduced more than those in FIG. 10 where k=1. Such reduction in the currents il and ic is preferable in view of reduction in the power capacitance required for the reactor L4 and the capacitor C4 that are used in the power buffer circuit 4, and downsizing the reactor L4 and the capacitor C4 and reduction in their costs.

(g-5) Example of Technique for Distributing Ripple of Power According to Distribution Factor k This section will describe an example of a technique for satisfying Equation (24) and distributing the ripple of power according to the distribution factor k.

In this example, operations on a normal AC load are dq-axis controlled which is well known. The power equation on the dq-axis is generally expressed by Equation (25). The symbols V* and I denote a command value of a voltage to be applied to the AC load and a current flowing through the AC load, respectively. Since these are alternating, a dot representing a complex number is on each of the symbols V* and I. Note that a q-axis voltage and a d-axis voltage ideally follow a command value (hereinafter referred to as a "q-axis voltage command value") Vq* and a command value (hereinafter referred to as a "d-axis voltage command value") Vd*, respectively.

$$P+jQ = \dot{V}^* \cdot \dot{I} = Vd^* \cdot Id + Vq^* \cdot Iq + j(Vq^* \cdot Id - Vd^* \cdot Iq) \quad (25)$$

Since the power supplied from the DC power lines LH and LL to the inverter 5 has no reactive power, the power is expressed by Equation (26) with disregard of the second term of Equation (25).

$$Pdc = Vq^* \cdot Id + Vq^* \cdot Iq \quad (26)$$

Figure 12:
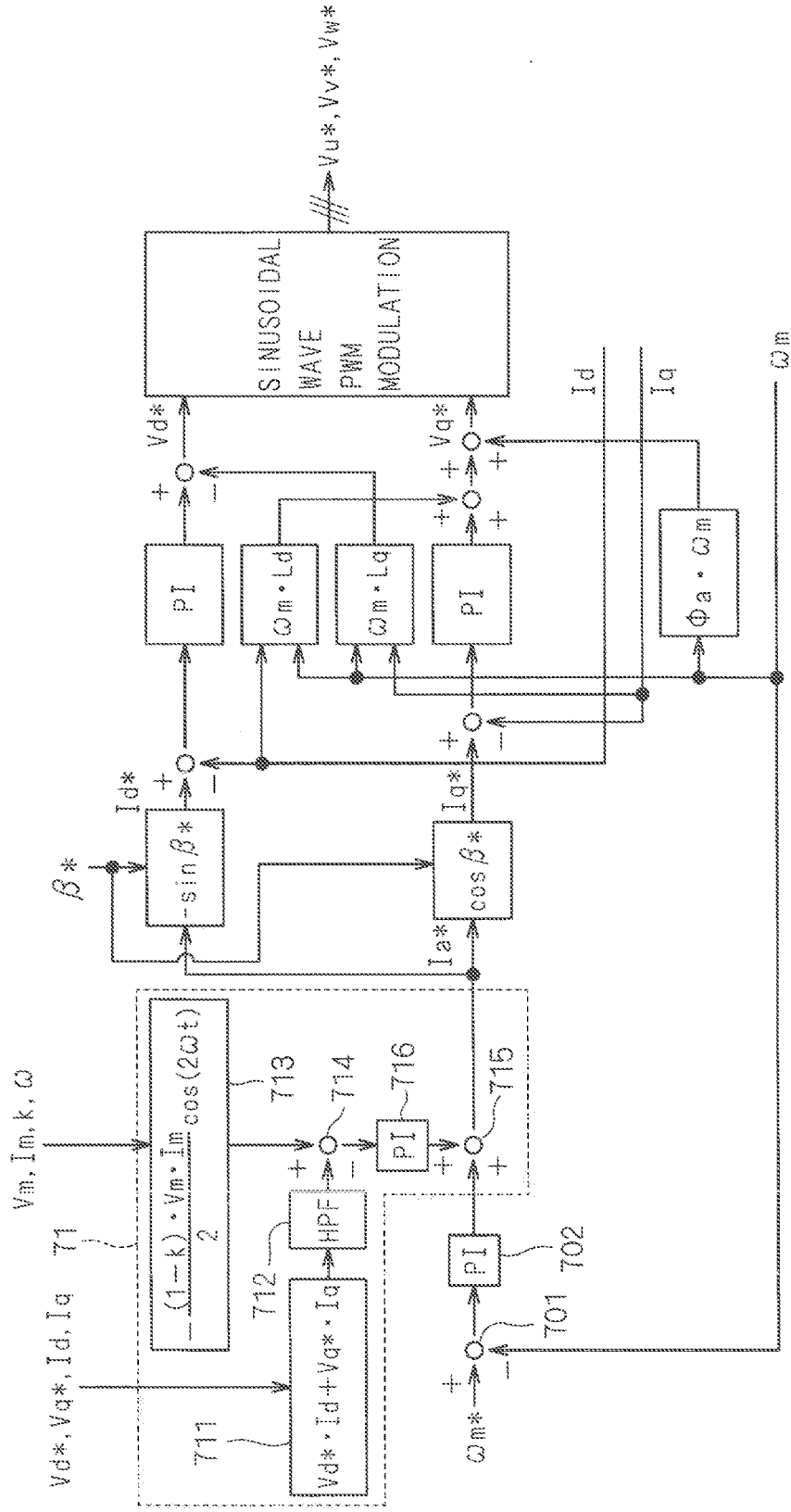
FIG. 12 is a block diagram illustrating an example of a structure for performing control with a DC current.

Thus, control can be performed by matching the AC component of Equation (26) with the second term in the right side of Equation (6) to satisfy Equation (24). FIG. 12 is a block diagram illustrating an example of a structure for performing the control. The structure is provided for, for example, the output voltage command generating unit 1011 in FIG. 2.

First, portions based on the prior art in the structure of FIG. 12 will be simply described. Trigonometric function values cos β* and −sin β* are obtained from a current phase command value β*, and a q-axis current command value Iq* and a d-axis current command value Id* are generated from the obtained trigonometric function values cos β* and −sin β* and a current command value Ia*. Assuming the inductive load 6 as a rotary machine, a q-axis voltage command value Vq* and a d-axis voltage command value Vd* are obtained on the basis of the rotational angular velocity ωm, a field flux Φa, a d-axis inductance Ld, and a q-axis inductance Lq of the rotary machine, the q-axis current command value Iq*, the d-axis current command value Id*, a q-axis current Iq, and a d-axis current Id. Then, voltage command values Vu*, Vv*, and Vw* are generated to control the inverter 5 using the q-axis voltage command value Vq* and the d-axis voltage command value Vd*.

In the structure illustrated in FIG. 1, for example, the velocity sensor 9 senses the load currents iu, iv, and iw flowing through the inductive load 6, and provides the control device 10 with the rotational angular velocity ωm, the q-axis current Iq, and the d-axis current Id based on the load currents iu, iv, and iw.

Hereinafter, a processor 71 that performs the control for matching the AC component of Equation (26) with the second term in the right side of Equation (6) will be described. The processor 71 includes a DC power calculator 711, a ripple component extractor 712, a ripple component calculator 713, a subtractor 714, an adder 715, and a PI processor 716.

The DC power calculator 711 receives the q-axis voltage command value Vq*, the d-axis voltage command value Vd*, the q-axis current Iq, and the d-axis current Id, and calculates the input power Pdc on the basis of Equation (26) and provides it to the ripple component extractor 712.

The ripple component extractor 712 extracts and outputs the AC component of Equation (6). The ripple component extractor 712 is, for example, a high-pass filter (HPF).

The ripple component calculator 713 receives the amplitudes Vm and Im, the angular velocity ω, and the distribution factor k, and obtains the second term in the right side of Equation (6). The ripple component calculator 713 can receive the amplitude Vm and the angular velocity ω as information obtained from the single-phase AC power source 1 (see FIG. 1). The ripple component calculator 713 can receive the amplitude Im from the amplitude determining unit 103a.

As described above, the desired process is to match the AC component of Equation (26) with the second term in the right side of Equation (6). Thus, the control may be performed by reducing a difference between the output of the ripple component extractor 712 and the output of the ripple component calculator 713. Accordingly, the subtractor 714 calculates the difference. The PI processor 716 performs proportional-integral control on the difference, and outputs a resulting value to the adder 715.

The adder 715 corrects the current command value Ia* in normal processes, using the output of the PI processor 716. Specifically, a subtractor 701 calculates a deviation between the rotational angular velocity ωm and its command value ωm* as the normal processes for obtaining the current command value Ia*. A PI processor 702 performs proportional-integral control on the deviation to temporarily obtain the current command value Ia*. Then, the adder 715 increases the current command value Ia* using the output from the PI processor 716.

Then, the q-axis voltage command value Vq* and the d-axis voltage command value Vd* are generated by applying the known technique to the current command value Ia* corrected by the processor 71 in such a manner. Such a control is performed by applying feedback to the q-axis voltage command value Vq*, the d-axis voltage command value Vd*, the q-axis current Iq, and the d-axis current Id so that the difference output from the subtractor 714 converges to 0. In other words, such a control enables the AC component of Equation (26) to be matched with the second term in the right side of Equation (6).

H. Third Embodiment (h-1) Setting of Duty

The third embodiment does not adopt the quarter-period control adopted in the first and second embodiments. In other words, the rectifying duty drec and the discharge duty dc are defined without particularly distinguishing between the receiving period and the providing period in the third embodiment. However, the rectifying duty drec and the discharge duty dc do not depend on the distribution factor k, similarly as the first and the second embodiments.

Specifically, the rectifying duty drec and the discharge duty dc are determined by Equation (27) and Equation (28), respectively.

$$drec = \frac{Vdc}{Vm} \cdot |\sin(\omega t)| \quad (27)$$

$$dc = \frac{Vdc}{Vc} \cdot \cos^2(\omega t) \quad (28)$$
$$= \frac{Vdc}{2 \cdot Vc} \cdot [1 + \cos(2\omega t)]$$

Although the both-end voltage Vc contains ripples to be described later, it is maintained almost constant. Thus, the discharge duty dc is in direct proportion to $[1+\cos(2\omega t)]$, and varies at a frequency twice that of the single-phase AC voltage Vin as a fundamental frequency. Since the discharge duty dc is defined without distinguishing between the receiving period and the providing period in the third embodiment as described above, the providing power Pc provided by the power buffer circuit 4 to the DC link 7 also varies at the frequency twice that of the single-phase AC voltage Vin as a fundamental frequency.

Equation (29) is obtained from Equations (27) and (28). Accordingly, Equation (7) identically holds. Thus, the DC voltage Vdc can be set to a constant value.

$$Vrec \cdot drec + Vc \cdot dc + 0 \cdot dz = Vm \cdot |\sin(\omega t)| \cdot \frac{Vdc}{Vm} \cdot \quad (29)$$
$$|\sin(\omega t)| + Vdc \cdot \cos^2(\omega t)$$
$$= Vdc$$

Furthermore, $0 \leq drec \leq 1$ is satisfied under $Vdc \leq Vm$. Furthermore, setting the DC voltage Vdc lower than or equal to the both-end voltage Vc can establish a setting that satisfies $0 \leq dc \leq 1$ and $drec+dc+dz=1$.

(h-2) Reactor Current il

Next, the reactor current il required to satisfy Equation (6), that is, the reactor current command il* is obtained. Since the input power Pdc is expressed by a product of the DC voltage Vdc and the DC current Idc as described above, the current irec1 is obtained by the next Equation (30) from Equations (24) and (27).

$$irec1 = drec \cdot Idc \quad (30)$$
$$= \frac{Vdc}{Vm} \cdot |\sin(\omega t)| \cdot \frac{Vm \cdot Im}{2 \cdot Vdc} \cdot [1 - (1-k) \cdot \cos(2\omega t)]$$
$$= \frac{Im}{2} \cdot |\sin(\omega t)| \cdot [1 - (1-k) \cdot \cos(2\omega t)]$$

Then, the reactor current command il* is determined by the next Equation (31) so that the input current Iin has a sinusoidal waveform. As understood from Equation (31), the reactor current command il* varies at the frequency twice that of the single-phase AC voltage Vin as a fundamental frequency. Furthermore, the rectified voltage Vrec varies in the same manner. Thus, the receiving power Pl received by the power buffer circuit 4 from the DC link 7 also varies at the frequency twice that of the single-phase AC voltage Vin as a fundamental frequency.

Consequently, both the receiving power Pl and the providing power Pc are set to vary at the frequency twice that of the single-phase AC voltage Vin as a fundamental frequency according to the third embodiment.

$$I1^* = Im \cdot |\sin(\omega t)| - irec1 \quad (31)$$
$$= \frac{Im}{2} \cdot |\sin(\omega t)| \cdot [1 + (1-k) \cdot \cos(2\omega t)]$$

Furthermore, Equations (32) can yield a function F3 (ωt) from Equation (31) according to the third embodiment.

$$iL^* = Im \cdot F3(\omega t) \quad (32)$$
$$F3(\omega t) = \frac{1 + (1-k) \cdot \cos(2\omega t)}{2}$$

The function F3 (ωt) is determined according to the discharge duty dc determined by Equation (28), the rectifying duty drec determined by Equation (27), and the distribution factor k.

(h-3) Behaviors of Various Quantities

Figure 13:
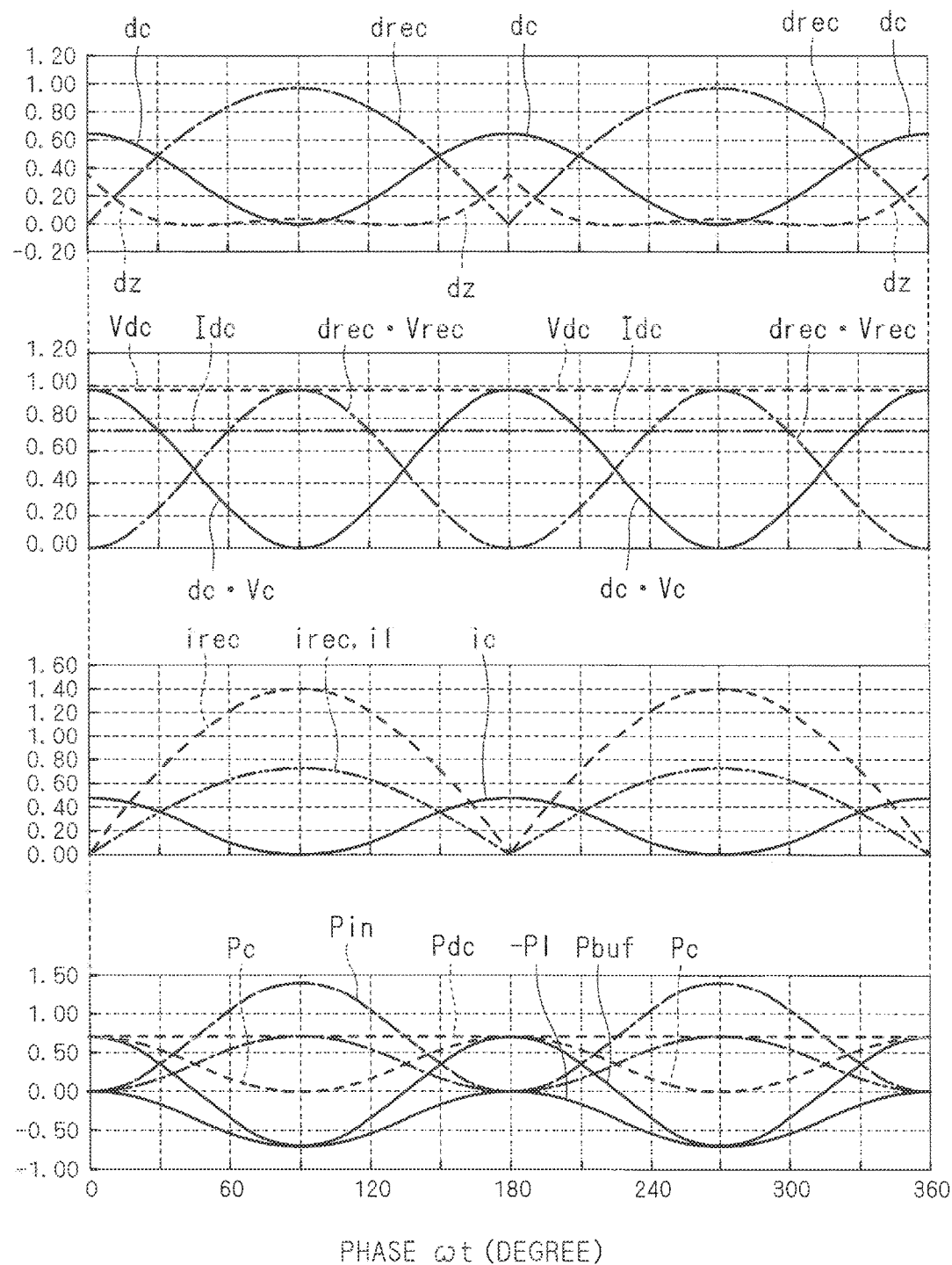
FIGS. 13 and 14 are graphs indicating operations of a direct power converter according to a third embodiment.
Figure 14:
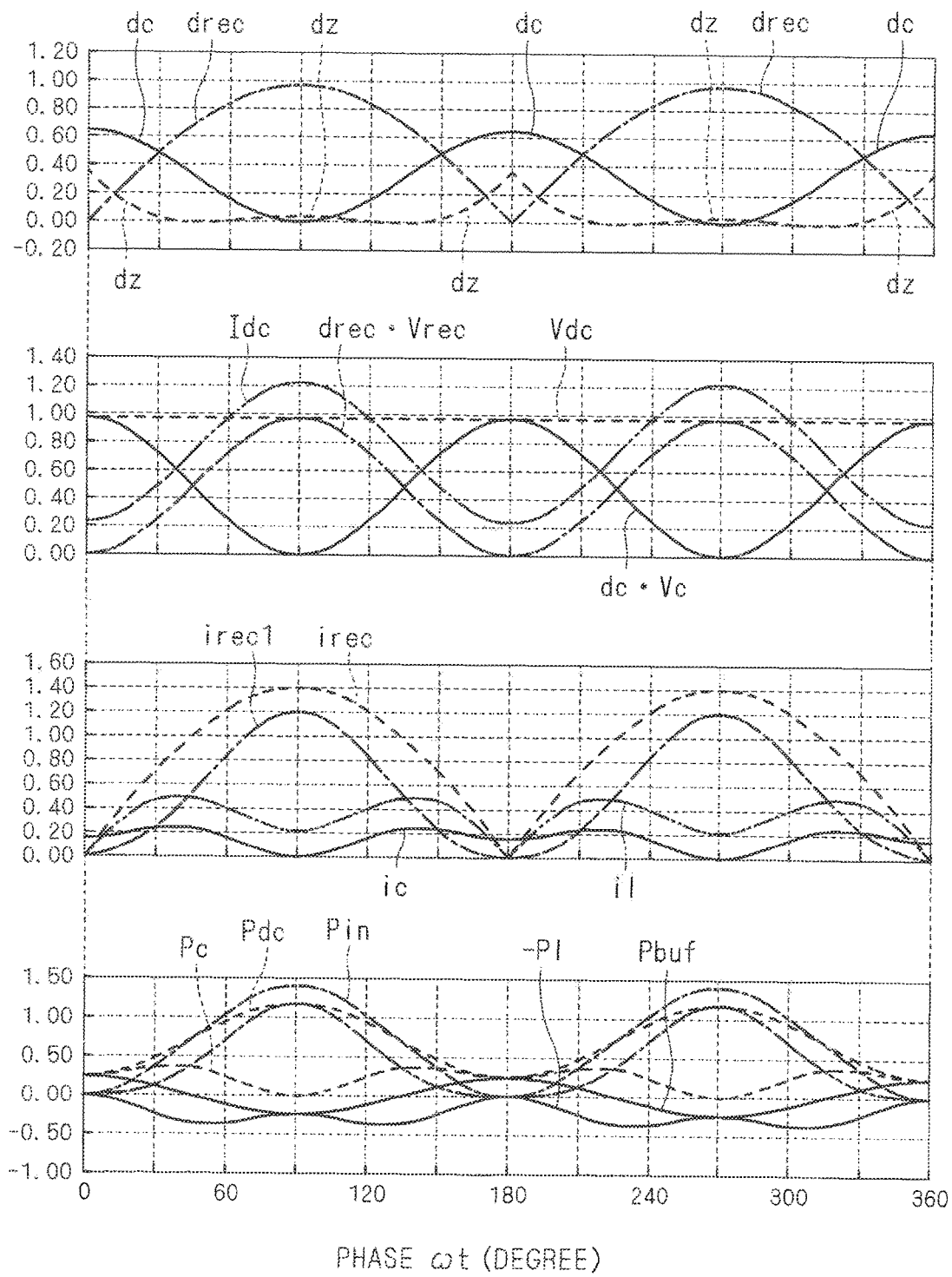

FIGS. 13 and 14 are graphs each representing operations of the direct power converter illustrated in FIG. 1 when the duties drec, dc, and dz are set according to the third embodiment. FIG. 13 illustrates a case where k=1, whereas FIG. 14 illustrates a case where k=⅓.

In both FIGS. 13 and 14, the topmost graph illustrates the duties drec, dc, and dz, the graph second from the top illustrates the DC voltage Vdc (see Equation (29)), the voltages Vrec·drec and Vc·dc (see Equation (7)) that are included in the DC voltage Vdc, and the DC current Idc (see Equation (24)), the graph third from the top illustrates the currents irec, ic, il, and irec1, and the bottom graph illustrates the instantaneous powers Pin, Pout, and Pbuf.

In both FIGS. 13 and 14, the horizontal axis represents the phase ωt using "degree" as the unit. Furthermore, the currents Idc, irec, ic, il, and irec1 have been converted using the amplitude Im as √2, and R=0.96 and α=1.5 were set. The voltages Vrec·drec and Vc·dc have been converted using the amplitude Vm as 1. The instantaneous powers Pin, Pout, and Pbuf are obtained as respective products of the voltages and the currents that have been converted as above.

Since the duties drec and dc do not depend on the distribution factor k as described above, the DC voltage Vdc and the voltages Vrec·drec and Vc·dc that are included in the DC voltage Vdc have the same waveforms in both FIGS. 13 and 14.

However, since the DC current Idc is expressed by Equation (24) and depends on the distribution factor k, it largely differs between k=1 in FIG. 13 and k=⅓ in FIG. 14. Particularly, when k=1, the DC current Idc becomes constant with the constant DC voltage Vdc, independent of the phase ωt.

It is clear that the third embodiment can adopt the structure introduced in "(g-5) Example of technique for distributing ripple of power according to distribution factor k".

The currents ic and il in the graph third from the top in FIG. 14 where k=⅓ are reduced more than those in FIG. 13 where k=1. Such reduction in the currents it and ic is preferable in view of reduction in the power capacitance required for the reactor L4 and the capacitor C4 that are used in the power buffer circuit 4, and downsizing the reactor L4 and the capacitor C4 and reduction in their costs.

(h-4) Advantages

FIGS. 15 and 16 are graphs each indicating behaviors of various quantities when the technique proposed by the third embodiment is adopted. FIG. 15 indicates a case where the actual electrostatic capacity of the buffer capacitor after 0.1 second decreases by 30% with respect to the electrostatic capacity before the 0.1 second, and FIG. 16 indicates a case where the actual electrostatic capacity of the buffer capacitor after 0.1 second increases by 30% with respect to the electrostatic capacity before the 0.1 second.

Although the input power Pdc is the same in the first and third embodiments, the amplitudes of the load currents iu, iv, and iw in the third embodiment are smaller than those in the first embodiment because the voltage utilization factor R in the third embodiment is 0.96 whereas the voltage utilization factor R in the first embodiment is 1/√2 (≈0.71).

As understood from the comparison between FIGS. 15 and 6 and the comparison between FIGS. 16 and 7, although variations in the fluctuation (Vcmax−Vcmin) remain, variations in the amplitude Im and in the peak value of the reactor current command il* according to the technique proposed by the third embodiment are smaller than those when the technique of Japanese Patent Application Laid-Open No. 2014-107935 has been adopted. The average of the amplitudes Im is approximately 23 A as according to the first embodiment.

In order to reduce variations in the amplitude Im, the responsiveness of the charge controller 103 is preferably less than or equal to one tenth of a value twice the frequency (ω/(2π)) of the single-phase AC voltage Vin as described in the first embodiment.

Accordingly, the charge command iL* can be obtained using the function F3 (ωt) according to the third embodiment similarly as the function F1 (ωt) according to the first embodiment. Furthermore, the prominent variations in the both-end voltage Vc are avoided even when the actual electrostatic capacity of the buffer capacitor varies similarly as in the first embodiment.

I. Modifications

The filter 2 can be provided between the converter 3 and the power buffer circuit 4 in any of the techniques described above.

FIG. 17 is a circuit diagram illustrating only the vicinity of the filter 2 provided between the converter 3 and the power buffer circuit 4 as the modification.

When such a structure is adopted, a diode Do is preferably provided in the DC power line LH and between the filter 2 and the discharge circuit 4a. The anode of the diode Do is disposed closer to the filter 2, and the cathode thereof is disposed closer to the discharge circuit 4a.

The diode Do can prevent the voltage Vc across the capacitor C4 from influencing the both-end voltage of the capacitor C2 through switching of the switch Sc. This advantage is introduced by, for example, Japanese Patent Application Laid-Open No. 2014-96976.

While the invention has been shown and described in detail, the foregoing description is in all aspects illustrative and does not restrict the invention. It is therefore understood that numerous modifications and variations can be devised without departing from the scope of the invention.

The invention claimed is:

1. A direct-power-converter control device that controls a direct power converter,
said direct power converter including:
a DC link including a first power supply line and a second power supply line;
a converter that receives a single-phase AC voltage, and outputs ripple power to said DC link in which said first power supply line is higher in potential than said second power supply line;
a power buffer circuit provided between said first and second power supply lines, said power buffer circuit buffering power by buffered power obtained by multiplying an AC component of said ripple power by a distribution factor; and
an inverter that converts a DC voltage between said first and second power supply lines into an AC voltage,
said power buffer circuit including:
a discharge circuit including a capacitor and a switch connected in series with said capacitor between said first and second power supply lines, said switch being closer to said first power supply line relative to said capacitor; and
a charge circuit that charges said capacitor,
said control device comprising an inverter controller, a discharge controller, and a charge controller,
wherein said inverter controller outputs an inverter control signal for controlling an operation of said inverter on the basis of a rectifying duty, a discharge duty, and a command value of a voltage to be output by said inverter, said rectifying duty being a duty at which said converter is brought into conduction with said DC link, said discharge duty being a duty at which said switch is conducting, said discharge controller outputs a discharge switch signal for bringing said switch into conduction on the basis of said discharge duty, and said charge controller includes:

an amplitude determining unit that determines an amplitude of an input current to be input to said converter by performing at least proportional-integral control on a deviation between a voltage across said capacitor and an average voltage command value that is a command value of an average of said voltage across said capacitor;

a charge command generating unit that determines a charge command on a current flowing through said charge circuit by multiplying by said amplitude a function of a phase of said single-phase AC voltage, said function being determined according to said discharge duty, said rectifying duty, and said distribution factor; and a charging operation controller that controls a charging operation of said charge circuit on the basis of said charge command.

2. The direct-power-converter control device according to claim 1, wherein said discharge duty and said rectifying duty are set so that said power buffer circuit receives power from said DC link during a period during which a cosine value is negative and provides power to said DC link during a period during which said cosine value is positive, said cosine value being a cosine of a value twice said phase.

3. The direct-power-converter control device according to claim 2, wherein responsiveness of said charge controller is less than or equal to one tenth of a value twice a frequency of said single-phase AC voltage.

4. The direct-power-converter control device according to claim 2, wherein said function is determined with said input current having a sinusoidal waveform.

5. The direct-power-converter control device according to claim 4, wherein responsiveness of said charge controller is less than or equal to one tenth of a value twice a frequency of said single-phase AC voltage.

6. The direct-power-converter control device according to claim 1, wherein power received by said power buffer circuit from said DC link and power provided by said power buffer circuit to said DC link are set to vary at a frequency twice a frequency of said single-phase AC voltage as a fundamental frequency.

7. The direct-power-converter control device according to claim 6, wherein responsiveness of said charge controller is less than or equal to one tenth of a value twice a frequency of said single-phase AC voltage.

8. The direct-power-converter control device according to claim 6, wherein said function is determined with said input current having a sinusoidal waveform.

9. The direct-power-converter control device according to claim 8, wherein responsiveness of said charge controller is less than or equal to one tenth of a value twice a frequency of said single-phase AC voltage.

10. The direct-power-converter control device according to claim 1, wherein said function is determined with said input current having a sinusoidal waveform.

11. The direct-power-converter control device according to claim 10, wherein responsiveness of said charge controller is less than or equal to one tenth of a value twice a frequency of said single-phase AC voltage.

12. The direct-power-converter control device according to claim 1, wherein responsiveness of said charge controller is less than or equal to one tenth of a value twice a frequency of said single-phase AC voltage.

* * * * *